United States Patent
Amano et al.

(10) Patent No.: US 10,961,004 B2
(45) Date of Patent: Mar. 30, 2021

(54) MEDICINAL AGENT INSPECTION SYSTEM, WINDING DEVICE, FEED DEVICE, AND HOLDER

(71) Applicant: YUYAMA MFG. CO., LTD., Toyonaka (JP)

(72) Inventors: Hirokazu Amano, Toyonaka (JP); Hiromichi Tsuda, Toyonaka (JP); Yasuyuki Yoshikawa, Toyonaka (JP); Hirokazu Chihara, Toyonaka (JP); Dai Shimizube, Toyonaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 134 days.

(21) Appl. No.: 16/028,380

(22) Filed: Jul. 5, 2018

(65) Prior Publication Data
US 2018/0312285 A1 Nov. 1, 2018

Related U.S. Application Data

(62) Division of application No. 14/433,633, filed as application No. PCT/JP2013/075585 on Sep. 20, 2013, now Pat. No. 10,858,134.

(30) Foreign Application Priority Data

Oct. 3, 2012 (JP) .................................. 2012-221037
Nov. 19, 2012 (JP) .................................. 2012-253034
Feb. 28, 2013 (JP) .................................. 2013-038275

(51) Int. Cl.
*B65B 57/04* (2006.01)
*B65H 75/28* (2006.01)
(Continued)

(52) U.S. Cl.
CPC ................. *B65B 57/04* (2013.01); *A61J 1/03* (2013.01); *B65B 1/04* (2013.01); *B65B 9/06* (2013.01);
(Continued)

(58) Field of Classification Search
CPC B65B 1/04; B65B 57/04; B65B 57/10; B65B 9/06; B65B 43/123; B65B 51/10;
(Continued)

(56) References Cited

U.S. PATENT DOCUMENTS 4,160,410 A * 7/1979 Fichter ................... B65B 61/26
101/10
4,437,619 A 3/1984 Cary et al.
(Continued)

FOREIGN PATENT DOCUMENTS

CN 1804601 A 7/2006
JP H0262060 A 3/1990
(Continued)

OTHER PUBLICATIONS

WIPO, Japanese International Search Authority, International Search Report dated Jan. 7, 2014 in International Patent Application No. PCT/JP2013/075585 in English, 5 pages.

*Primary Examiner* — Dariush Seif
(74) *Attorney, Agent, or Firm* — Masuvalley & Partners

(57) ABSTRACT

To provide a medicine inspection system capable of appropriately outputting an inspection result while minimizing damage and the like to a packaging bag and a medicine. A medicine inspection system 10 includes an inspection device 20 which inspects a numerical quantity and/or a type of a medicine contained in a packaging bag p based on an image photographed of the packaging bag p to be inspected, and a marking device 50 which records an inspection result from the inspection device on the packaging bag p. After the
(Continued)

packaging bag p, which has a seal section S formed by pressure bonding an overlapping portion of a packaging paper, is inspected at the inspection device 20, a stamp which indicates the inspection result thereof is output by a marking device 50 onto the seal section S.

4 Claims, 26 Drawing Sheets

(51) Int. Cl.
| | | |
|---|---|---|
| B65H 59/36 | (2006.01) | |
| B65H 59/38 | (2006.01) | |
| B65H 75/40 | (2006.01) | |
| B65B 61/26 | (2006.01) | |
| B65B 57/10 | (2006.01) | |
| B65B 9/06 | (2012.01) | |
| G01N 21/95 | (2006.01) | |
| B65H 23/182 | (2006.01) | |
| B65H 23/195 | (2006.01) | |
| B65H 16/04 | (2006.01) | |
| B65H 16/10 | (2006.01) | |
| B65H 18/02 | (2006.01) | |
| B65H 18/10 | (2006.01) | |
| A61J 1/03 | (2006.01) | |
| B65B 1/04 | (2006.01) | |
| B65B 43/12 | (2006.01) | |
| B65B 45/00 | (2006.01) | |
| B65B 51/10 | (2006.01) | |
| B65H 23/04 | (2006.01) | |

(52) U.S. Cl.
CPC ............ *B65B 43/123* (2013.01); *B65B 45/00* (2013.01); *B65B 51/10* (2013.01); *B65B 57/10* (2013.01); *B65B 61/26* (2013.01); *B65H 16/04* (2013.01); *B65H 16/103* (2013.01); *B65H 18/026* (2013.01); *B65H 18/10* (2013.01); *B65H 23/044* (2013.01); *B65H 23/182* (2013.01); *B65H 23/195* (2013.01); *B65H 59/36* (2013.01); *B65H 59/385* (2013.01); *B65H 59/387* (2013.01); *B65H 75/28* (2013.01); *B65H 75/403* (2013.01); *G01N 21/9508* (2013.01); *B65H 2403/942* (2013.01); *B65H 2511/112* (2013.01); *B65H 2511/512* (2013.01); *B65H 2513/11* (2013.01); *B65H 2701/1942* (2013.01); *B65H 2701/37* (2013.01); *B65H 2801/69* (2013.01)

(58) Field of Classification Search
CPC . B65B 61/26; B65H 2301/5111; B65H 16/04; B65H 16/103; B65H 16/026; B65H 18/10; B65H 23/044; B65H 23/182; B65H 23/195; B65H 59/36; B65H 59/385; B65H 59/387; B65H 2403/942; B65H 2511/112; B65H 2511/512; B65H 2513/11; B65H 2701/1942; B65H 2701/37; B65H 2801/69
USPC ........... 53/52, 53, 54, 494, 501, 64, 65, 167, 53/131.2; 382/141, 143, 152, 199, 256; 378/57
See application file for complete search history.

(56) References Cited

U.S. PATENT DOCUMENTS

| | | | | |
|---|---|---|---|---|
| 4,729,203 A * | 3/1988 | Astwood | ............... | B65B 43/123 53/384.1 |
| 5,115,626 A * | 5/1992 | Rutter | ........................ | B65B 9/13 53/284.7 |
| 5,279,099 A * | 1/1994 | Goodman | ............... | B65B 5/061 53/247 |
| 5,408,806 A * | 4/1995 | Lin | ............................ | B65B 9/06 493/476 |
| 5,458,062 A * | 10/1995 | Goldberg | ............. | B65H 23/046 101/226 |
| 5,607,063 A * | 3/1997 | Nishijima | ................. | B07C 3/00 209/584 |
| 5,678,393 A * | 10/1997 | Yuyama | ................... | B65B 57/14 53/493 |
| 5,839,257 A * | 11/1998 | Soderstrom | ............. | B65B 61/26 53/411 |
| 5,979,732 A * | 11/1999 | Crowley | ............... | B41J 11/0005 226/111 |
| 6,330,351 B1 * | 12/2001 | Yasunaga | ........... | G01N 21/9508 235/375 |
| 7,562,512 B2 * | 7/2009 | Noguchi | ............... | B65B 51/306 53/167 |
| 9,387,155 B2 * | 7/2016 | Morioka | ............ | G01N 21/9508 |
| 2002/0083688 A1 * | 7/2002 | Yang | ......................... | B65B 9/06 53/550 |
| 2002/0175982 A1 | 11/2002 | Isago | | |
| 2005/0201622 A1 * | 9/2005 | Takarada | ............. | G06K 9/6212 382/218 |
| 2006/0164647 A1 * | 7/2006 | Shibata | ................... | G01N 21/89 356/430 |
| 2007/0093370 A1 * | 4/2007 | Chiari | ..................... | B65H 7/08 493/22 |
| 2009/0110322 A1 * | 4/2009 | Hadap | ................... | G06T 15/506 382/274 |
| 2009/0173791 A1 * | 7/2009 | Pine | ......................... | G06K 9/00 235/454 |
| 2010/0085428 A1 * | 4/2010 | Kim | ....................... | G01B 11/24 348/130 |
| 2010/0202818 A1 * | 8/2010 | Fuchs | .................... | B65H 20/32 400/619 |
| 2011/0127310 A1 * | 6/2011 | Kumazaki | .............. | B41J 15/042 226/102 |
| 2011/0252750 A1 * | 10/2011 | Koike | ...................... | B65B 51/28 53/479 |
| 2012/0012490 A1 * | 1/2012 | Brownell | ................. | B65B 9/213 206/459.5 |
| 2012/0096807 A1 * | 4/2012 | Okuma | ...................... | B65B 9/08 53/111 R |
| 2012/0200596 A1 * | 8/2012 | Gotou | ...................... | B07C 5/38 345/625 |
| 2012/0211585 A1 | 8/2012 | Kim | | |
| 2013/0277487 A1 * | 10/2013 | Ohmura | ................. | B65H 20/34 242/419.8 |
| 2013/0282159 A1 * | 10/2013 | Morioka | ............ | G01N 21/9508 700/109 |
| 2013/0342676 A1 * | 12/2013 | Amano | .................... | H04N 7/18 348/86 |
| 2015/0266604 A1 * | 9/2015 | Amano | ................... | B65H 16/04 53/65 |
| 2016/0128903 A1 * | 5/2016 | Uetake | ................... | A61J 1/035 206/531 |

FOREIGN PATENT DOCUMENTS

| | | |
|---|---|---|
| JP | H02232052 A | 9/1990 |
| JP | H04017664 | 2/1992 |
| JP | H07200770 A | 8/1995 |
| JP | H08322913 A | 12/1996 |
| JP | H09286418 A | 11/1997 |
| JP | H09299448 A | 11/1997 |
| JP | H1035626 A | 2/1998 |
| JP | H10162116 A | 6/1998 |
| JP | 200-006905 A | 1/2000 |
| JP | 2000142602 A | 5/2000 |
| JP | 2001-302954 A | 10/2001 |
| JP | 2003291929 A | 10/2003 |
| JP | 2006206070 A | 8/2006 |
| JP | 2009082287 A | 4/2009 |

(56) References Cited

FOREIGN PATENT DOCUMENTS

| KR | 10-0315996 B1 | 12/2001 | | |
|----|---------------|---------|---|---|
| KR | 10-2012-0095194 A | 8/2012 | | |
| WO | WO-2012081261 A1 * | 6/2012 | ............. | G05B 15/02 |

* cited by examiner

FIG. 18A
FIG. 18B
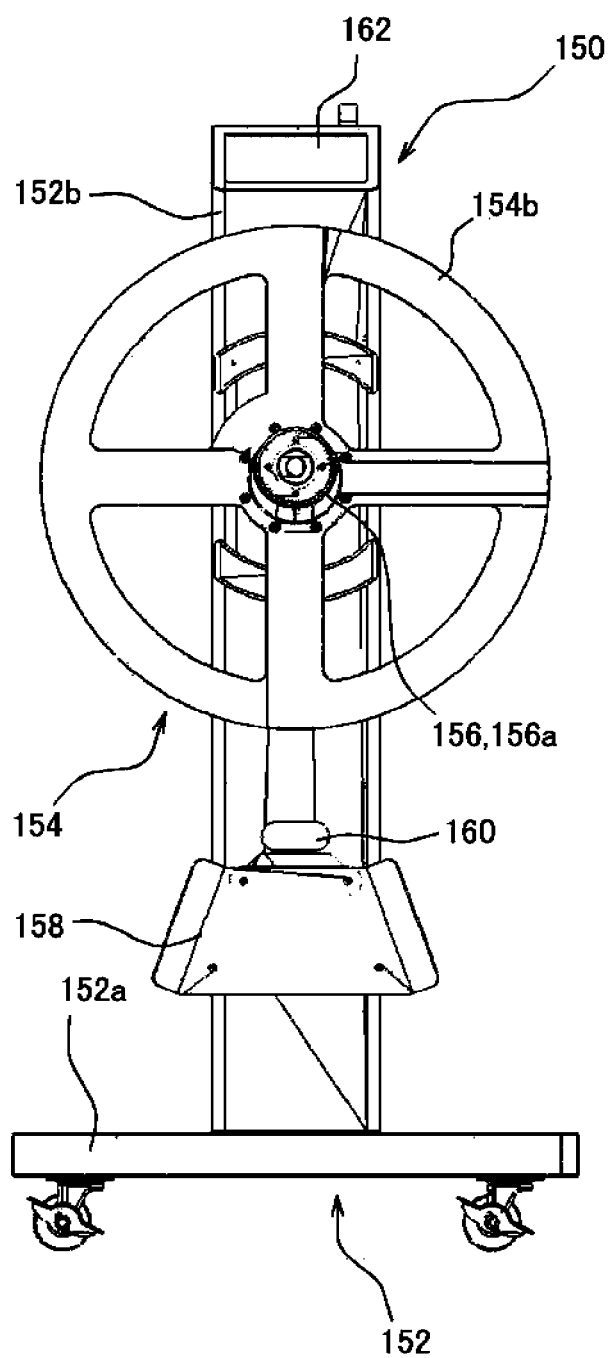
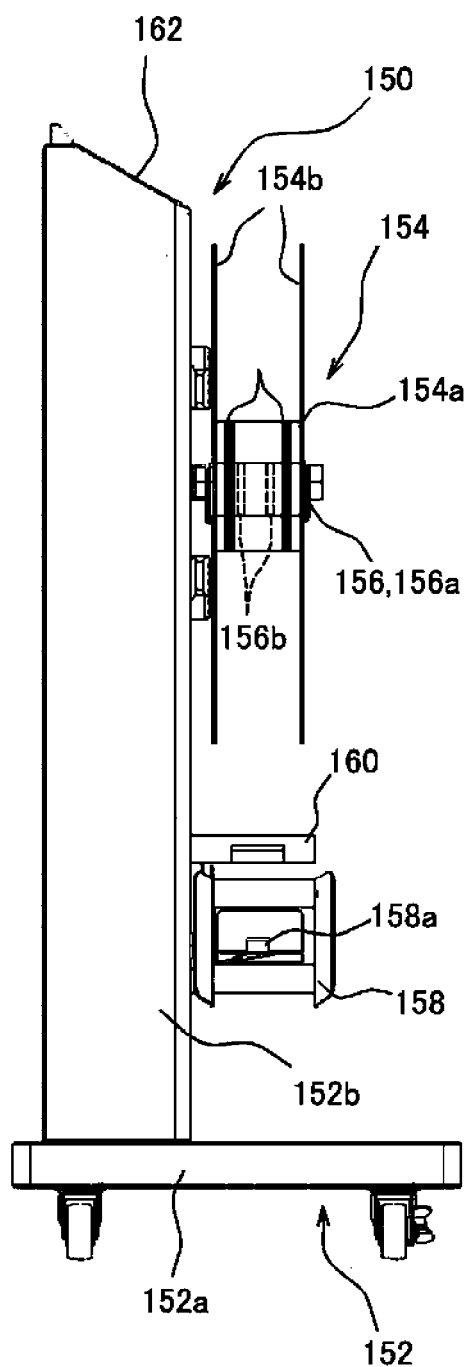

MEDICINAL AGENT INSPECTION SYSTEM, WINDING DEVICE, FEED DEVICE, AND HOLDER

RELATED APPLICATIONS

The present application is a divisional of U.S. patent application Ser. No. 14/433,633 filed Apr. 3, 2015 entitled Medicinal Agent Inspection System, Winding Device, Feed Device, And Holder, which is the U.S. National Phase of and claims priority to International Patent Application No. PCT/JP2013/075585 filed 20 Sep. 2013 entitled Medicinal Agent Inspection System, Winding Device, Feed Device, And Holder, which claims priority to Japanese Patent Application Number JP 2012-221037 filed 3 Oct. 2012; Japanese Patent Application Number JP 2012-253034 filed 19 Nov. 2012; and Japanese Patent Application Number JP 2013-038275 filed 28 Feb. 2013; all of which are incorporated herein by reference in their entireties.

TECHNICAL FIELD

The present invention relates to a medicine inspection device for inspecting a numerical quantity of a medicine, and to a medicine dividing and packaging device equipped with the medicine inspection device. Moreover, the present invention also relates to a holder capable of retaining in a roll shape, a band-shaped packaging bag continuous body lined with packaging bags divided into portions for single doses by a packaging paper, a winding device equipped with the same features, and a feed device.

BACKGROUND

Conventionally, a medicine dispensing device such as what is disclosed by patent document 1 below is provided. With the medicine dispensing device disclosed by the following patent document 1, solid medicines in the form of a granular substance, capsule, or the like can be divided by the packaging paper into individual dosage packs, and supplied. Moreover, the medicine dispensing device according to patent document 1 below is configured such that the solid medicine is photographed in a divided and packaged state by the packaging paper, wherein the numerical quantity of the solid medicine is inspected based on the image obtained.

Furthermore, as with the device for determining a number of tablets of patent document 2, and the parceling packer of an article of patent document 3 listed below, there exist other devices that also perform the likes of marking or printing, based on inspection results obtained from an image taken after a medicine has been divided and packaged.

PRIOR ART DOCUMENTS

Patent Documents

[Patent Document 1] Japanese Unexamined Patent Application Publication No. H07-200770
[Patent Document 2] Japanese Unexamined Patent Application Publication No. H04-17664
[Patent Document 3] Japanese Unexamined Patent Application Publication No. H10-35626

SUMMARY OF THE INVENTION

Problem to be Solved by the Invention

With the device for determining a number of tablets regarding the above-mentioned patent document 2, while the determined result for the number of tablets is marked at an appropriate location on the packaging bag, consideration is not given for damage done to the packaging bag or medicine due to impact from the marking process. Moreover, while the parceling packer of an article regarding the above-mentioned patent document 3 is configured to print a predetermined mark on the packaging paper based on the determined results, the invention thereof does not give adequate consideration to the likes of damages done on the packaging bag and medicine.

In order to solve the above-described problems, an object of the present invention is to provide a medicine inspection system capable of appropriately outputting an inspection result while minimizing damage and the like to a packaging bag and a medicine.

Means for Solving the Problem

The medicine inspection system of the present invention provided in order to resolve the above-described problem includes an inspection device which inspects a numerical quantity and/or a type of a medicine contained in a packaging bag to be inspected based on an image photographed of the packaging bag, and a marking device which records an inspection result from the inspection device on the packaging bag, wherein the packaging bag has a seal section formed by pressure bonding an overlapping portion of a packaging paper, and features a stamp which indicates the inspection result is output by the marking device onto the seal section.

With the medicine inspection system of the present invention, a stamp which indicates the inspection result can be output by the marking device onto the seal section formed by pressure bonding. Namely, a stamp indicating an inspection result is affixed to the seal section at a position that is separated from an area where the medicine is contained in the packaging bag. Through this, damage to the packaging bag and medicine resulting from impact when the stamp is affixed can be prevented. Moreover, because the seal section is a portion for which the packaging paper is overlapped and pressure bonded, the strength of the seal section is greater than that of other parts, wherein a stamp can be easily output. As a result, according to the medicine inspection system of the present invention, a stamp indicating the inspection result can be reliably affixed.

The above-described medicine inspection system of the present invention is favorable for cases in which the seal section has a plurality of dot-shaped seal marks formed by pressure bonding.

With the medicine inspection system of the present invention, a stamp indicating an inspection result can be output by a marking device on a seal section having a plurality of dot-shaped seal marks formed by pressure bonding. Namely, with the medicine inspection system of the present invention, because the stamp is output on a seal section on which the surface is made rough from the forming of the seal marks, the likes of ink used in outputting the stamp permeates through the surface, and does not easily disappear through the likes of friction. Thus, according to the medicine inspection system of the present invention, problems such as the stamp indicating the inspection result disappearing through the likes of friction can be prevented.

Moreover, with the medicine inspection system of the present invention, a dot-shaped stamp is affixed by the marking device onto a seal section on which a plurality of seal marks is formed. Therefore, although the dot-shaped stamp affixed by the marking device does not become projected and become pronounced at the seal section, it is in a state in which a pharmacist or other operator checking the medicine can fully identify the stamp. Therefore, according to the medicine inspection system of the present invention, a stamp indicating an inspection result can be affixed in a state that allows thorough checking by an operator while preventing the degradation of the external appearance of the packaging bag.

The above-described medicine inspection system of the present invention ideally outputs a stamp on the seal section by the marking device upon the condition of faulty inspection results.

By adopting such a configuration, the process of inspection through an image inspection device and finding such packaging bags with faulty inspection results from amongst a large amount of bands can be simplified, and operational efficiency can be improved. Moreover, the disappearing of the stamp during the time period until an operator can visually check at least the presence or absence of the stamp can be prevented by outputting a stamp in the seal section. In addition, by adopting the above-described configuration, the frequency at which a stamp is affixed to the seal section by the marking device can be minimized, and the processing speed can be accelerated.

The above-described medicine inspection system of the present invention is capable of inspecting each packaging bag forming a packaging bag continuous body by supplying to the inspection device, the packaging bag continuous body for which a plurality of packaging bags, in which a medicine is divided and packaged in accordance with a prescription, is continuously formed after an empty packaging bag, wherein a stamp which differs from the stamp indicating the inspection results is preferably output on the empty packaging bag.

By outputting for an empty packaging bag, a stamp that differs from the stamp that indicates the inspection results as with the present invention, the operation of the marking device can be checked based on the presence or absence of the stamp thereof. Moreover, it can be determined that an inspection has been conducted for each of the packaging bags forming a series of a packaging bag continuous body including the empty packaging bag thereof based on a stamp being affixed to the empty packaging bag.

The above-described medicine inspection system of the present invention is provided with an identification device capable of identifying the presence or absence of a stamp output to the empty packaging bag, and may determine if an operational problem has occurred with the marking device based on the stamp output to the empty packaging bag not being identified by the identification device.

By adopting such a configuration, an operational problem of the marking device can be determined without visual confirmation or the like by an operator.

With the above-described medicine inspection system of the present invention, the marking device preferably outputs the inspection result using an ink that can be made to be visually non-confirmable by the application of heat.

In the case of such a configuration, when it is desired to make the stamp affixed to the packaging bag by the marking device not visible prior to handing over the packaging bag to a patient, the stamp can be made invisible by applying heat.

The above-described medicine inspection system of the present invention is favorably provided with a delivery unit, connected so as to be capable of delivering the packaging bag, between a medicine dividing and packaging device which packages single package portions of a medicine according to a prescription and the inspection device.

In the case of such a configuration, the packaging bags, formed from dividing and packaging the medicine by the medicine dividing and packaging device, can be supplied sequentially via the delivery unit to the inspection device and inspected. By adopting this type of configuration, the steps from dividing and packaging the medicine to the inspection process can be implemented as a continuous flow, and the time and labor required for the series of operations can be minimized.

Moreover, with the above-described medicine inspection system of the present invention, the inspection device includes an inspection unit where the packaging bag containing the medicine to be inspected is positioned, and a photographing device which photographs a packaging bag positioned at the inspection unit, wherein determining that a packaging bag is not present at the inspection unit is preferably implemented as a feature based on the photographing device itself being captured in an image photographed by the inspection unit by the photographing device.

Through such a configuration, the presence or absence of a packaging bag at the inspection unit can be easily and accurately understood.

The medicine inspection system of the present invention is capable of inspecting each packaging bag for the medicine supplied as a band-shaped packaging bag continuous body lined with packaging bags divided into portions for single doses by the packaging paper, and includes an inspection unit at which a packaging bag containing a medicine to be inspected is arranged, and a conveyance device capable of conveying the packaging bag continuous body on a conveyance path which passes the inspection unit as a feature, wherein the conveyance device has a conveyance width adjusting member extending in a direction along a conveyance direction of the packaging bag continuous body, and is capable of adjusting a width of a conveyance area provided for conveyance of the packaging bag continuous body at the conveyance device by moving the conveyance width adjusting member in a direction intersecting the conveyance direction.

Through such a configuration, even in cases where the width of the packaging bag continuous body supplied as the target for inspection is varied, the width of the conveyance path can be changed in accordance with the width of the packaging bag continuous body that is supplied. Through this, the packaging bag continuous body can be supplied in roughly a straight manner with respect to the inspection unit, and an improvement in inspection precision can be expected. Namely, the medicine inspection system of the present invention is capable of accommodating and inspecting packaging bag continuous bodies of various widths. Moreover, according to the above-described configuration, conveyance problems such as the packaging bag continuous body being conveyed in an unexpected direction, and causing the likes of a jam within the device, and secondary problems associated therewith can be prevented.

With the above-described medicine inspection system, the conveyance width adjusting member is formed by a plate body, the conveyance device has a plurality of insertion grooves in which the conveyance width adjusting member can be inserted in the width direction, and the width of the conveyance area provided for the conveyance for the packaging bag continuous body may be adjustable by inserting the conveyance width adjusting member into the insertion grooves.

By adopting such a configuration, the conveyance width adjusting member can be easily and reliably positioned and secured at the appropriate location. Moreover, according to the present invention, by merely providing insertion grooves in the conveyance device and preparing the conveyance width adjusting member, packaging bag continuous bodies of various widths can be accommodated, and width adjustments on a user level can be performed without making any significant modifications or such to the conveyance device.

Moreover, the above-described medicine inspection system of the present invention includes an inspection unit where the packaging bag containing the medicine to be inspected is arranged, a photographing device which photographs a packaging bag arranged at the inspection unit, a front side illumination device capable of illuminating the inspection unit from the photographing device side, and a back side illumination device capable of illuminating the inspection unit from a side opposite of the photographing device; and is capable of implementing bag run out determination processing to determine the presence or absence of a packaging bag in the inspection unit using a front side illuminated image photographed by the photographing device when the front side illumination device is in an ON state and the back side illumination device is in an OFF state, or using a back side illuminated image photographed by the photographing device when the front side illumination device is in an OFF state and the back side illumination device is in an ON state; wherein the bag run out determination processing may include a partition region detection step which detects a region in which the conveyance width adjusting member is installed based on brightness information obtained from the back side illuminated image, an inspection region specification step that specifies which region of regions divided with an installation region of the conveyance width adjusting member detected by the partition region detection step as a boundary, is the region at which the packaging bag continuous body to be inspected is supplied, a low brightness region extraction step for extracting a low brightness region, which has a level of brightness that is lower than a predetermined brightness, from brightness information obtained from the front side illuminated image, and a determination step which determines a state in which the bags have run out based on a brightness, within a region corresponding to a region of a predetermined size or larger derived in the small region elimination step with the back side illuminated image, being greater than a predetermined reference brightness.

According to the medicine inspection system of the present invention, by executing the bag run out determination processing, even if the conveyance width adjusting member is installed, the presence or absence of a packaging bag at the inspection unit can be correctly and accurately understood.

Moreover, with the medicine inspection system of the present invention, after the installation region of the conveyance width adjusting member is detected by the partition region detection step, and the inspection region is specified in the inspection region specification step, based on brightness information obtained from the front side illuminated image, the low brightness region extraction step and the small region elimination step can be executed to narrow down the regions for determining the presence or absence of a packaging bag. Furthermore, a region narrowed down in this manner can be applied to the back side illuminated image to determine whether the bags have run out or not in accordance with the brightness in this region compared to the predetermined reference brightness. Therefore, according to the medicine inspection system of the present invention, the presence or absence of a packaging bag at the inspection unit can be confirmed by efficiently utilizing a photographing device or such used for inspection without the provision of other sensors or the like.

Moreover, the winding device of the present invention features a winding device capable of executing an operation of winding a band-shaped packaging bag continuous body lined with packaging bags divided into portions for single doses by packaging paper, wherein the winding device includes a holder capable of winding the packaging bag continuous body into a roll shape, an operating unit capable of rotating the packaging bag continuous body in a direction of winding centered on the holder as the shaft center position, a looseness detection device positioned below the holder and capable of outputting a detection signal according to a distance from the packaging bag continuous body being wound onto the holder, and a control device capable of executing a winding operation of the packaging bag continuous body with respect to the holder by outputting an operation command to the operating unit. When the packaging bag continuous body is wound with respect to the holder, the control device advances the winding operation of the packaging bag continuous body based on the output of a detection signal, which indicates that a distance between the packaging bag continuous body and the looseness detection device has reached a state at which it has approached a value that is at or below a predetermined winding instruction distance.

The packaging bag continuous body handled with the winding device of the present invention is a continuum of packaging bags in which a medicine is divided and packaged. Therefore, when the winding device of the packaging bag continuous body implements a winding operation, the winding device thereof preferably implements the operation in a gentle manner such that an excessively large force is not acted on the packaging bag continuous body. Based on such knowledge, with the winding device of the present invention, when the packaging bag continuous body is wound with respect to the holder, a detection signal, which indicates that the distance between the packaging bag continuous body and the detection device has reached a state at which it has approached a distance at or below a predetermined winding instruction distance, is output from the looseness detection device, as the winding operation of the packaging bag continuous body is carried out. In other words, the winding operation of the packaging bag continuous body can be performed in a state in which the packaging bag continuous body is hanging a certain amount from the holder, and more specifically, in a state in which an excessively large force is not acted on the packaging bag continuous body and in which an excessively loose state does not occur. Through this, the operation of winding the packaging bag continuous body onto the holder can be implemented smoothly without an excessively large force being acted on the packaging bag continuous body.

Moreover, the winding device of the present invention is a winding device capable of executing an operation of winding a band-shaped packaging bag continuous body lined with packaging bags divided into portions for single doses by packaging paper, the winding device thereof including a holder capable of winding the packaging bag continuous body into a roll shape, an operating unit capable of rotating the packaging bag continuous body in a direction of winding centered on the holder as the shaft center position, a winding state detection device arranged at a position separate from the winding radial direction of the packaging bag continuous body with respect to the holder, and capable of outputting a detection signal in accordance with a distance from the packaging bag continuous body wound on the holder; and a control device capable of executing a winding operation of the packaging bag continuous body with respect to the holder by outputting an operation command to the operating unit; wherein the control device stops the winding operation based on the output of a detection signal which indicates that a distance between the winding state detection means and the packaging bag continuous body is at or below a predetermined winding upper limit distance.

According to such a configuration, the reaching of the winding upper limit amount of the packaging bag continuous body onto the holder can be reliably detected, and the winding operation can be stopped at an appropriate timing.

Moreover, a feed device of the present invention includes a holder capable of retaining in a roll shape the band-shaped packaging bag continuous body lined with packaging bags divided into portions for single doses by packaging paper, an operating unit capable of rotating the packaging bag continuous body in an unreeling direction centered on the holder as the shaft center position, a looseness detection device positioned below the holder and capable of outputting a detection signal according to a distance from the packaging bag continuous body being wound onto the holder, and a control device capable of executing an unreeling operation of the packaging bag continuous body at the holder by outputting an operation command to the operating unit; wherein at instance the packaging bag continuous body wound on the holder is being unreeled, the control device stops the unreeling operation or reduces the unreeling speed of the packaging bag continuous body based on the output of a detection signal which indicates that a distance between the packaging bag continuous body and the looseness detection device has reached a state at which it has approached a distance at or below a predetermined unreeling instruction distance.

With the feed device of the present invention, when the packaging bag continuous body wound onto the holder is unreeled, and the distance between the packaging bag continuous body and the detection device reaches a state at which it has approached a distance at or below the predetermined unreeling instruction distance, or in other words, when the unreeling speed is fast and the packaging bag continuous body becomes a state in which it is hanging from the holder, the unreeling operation of the packaging bag continuous body is stopped, or the unreeling speed thereof is reduced. Therefore, according to the feed device of the present invention, the unreeling speed of the packaging bag continuous body can be maintained at an optimum speed.

Note that the above-described winding device and feed device of the present invention may be respectively separate devices, but may also be a single device (winding and feed device) by using a common configuration that shares the likes of a holder, operating unit, and a looseness detection device.

Moreover, the holder of the present invention is a holder capable of retaining in a roll shape, a band-shaped packaging bag continuous body lined with packaging bags divided into portions for single doses by packaging paper, and includes a tube part on which the packaging bag continuous body is wound, and a pair of side panels provided at both ends of the tube part, as well as a pin inserted and extending between the pair of side panels, wherein a guide groove in which the slidable pin is formed in each of the pair of side panels so as to extend along an outer circumference of the tube part, and by sliding the pin along the guide grooves in a circumferential direction at one side, a clearance between an outer circumference surface of the tube part and the pin becomes smaller, and the packaging bag continuous body can be secured, and by sliding the pin in an opposite direction thereof, the clearance becomes larger, and the securement of the packaging bag continuous body can be released.

According to such a configuration, a holder capable of easily and reliably winding the packaging bag continuous body on the tube part can be provided. Moreover, through the force that acts when the packaging bag continuous body is unreeled, the pin is capable of sliding naturally in a direction of releasing the securement, and as a result, the packaging bag continuous body can constantly be unreeled while maintaining an optimum amount of tension, and the securement of the final end of the packaging bag continuous body can be naturally released from the holder at an optimum timing. Through this, the unreeling operation of the packaging bag continuous body can be completed without having to manually slide the pin.

The medicine inspection system of the present invention is provided with the above-described winding device of the present invention, and/or a feed device, a winding and feed device, and an inspection device that inspects a numerical quantity and/or type of medicine contained in the packaging bag based on the photographed image of the packaging bag to be inspected, wherein the winding and feed device is capable of supplying the packaging bag continuous body to the inspection device and/or winding the packaging bag continuous body discharged from the inspection device.

With the medicine inspection system of the present invention, the supply of the packaging bag continuous body to the inspection device and the winding of the packaging bag continuous body discharged from the inspection device can be performed using the above-described winding device and feed device. Through this, the convenience of the operation of inspecting the packaging bag continuous body at the inspection device can be improved.

Here, in order to improve the inspection accuracy of the medicine inspection system, the system is capable of ideally positioning and arranging the packaging bag to be inspected with good accuracy. Moreover, if the length of the packaging bags forming the packaging bag continuous body differ with each individual packaging, the position suited for inspection of the packaging bag to be inspected cannot be arranged with good accuracy by merely implementing handling measures such as advancing the packaging bag continuous body by a predetermined length each time the inspection of a single package portion is completed. Accordingly, when supplying a packaging bag continuous body having a mixture of packaging bags with different lengths as an inspection target, improving the positioning accuracy becomes a matter of more importance.

With a packaging bag continuous body for which a plurality of packaging bags is continuously formed, a boundary like that of a perforation for example is formed between each packaging bag. Therefore, if the boundary such as a perforation can be properly identified, it is conceivable that the positioning accuracy of the packaging bag to be inspected can be improved by using the boundary thereof as a reference. However, a boundary such as a perforation formed in a packaging bag continuous body often times does not vividly appear in the photographed image of the packaging bag continuous body. Therefore, when an attempt is made to select a boundary candidate through image processing, numerous candidates are derived, which poses a problem of difficulty in narrowing down those candidates for the appropriate boundary. Therefore, somehow selecting the appropriate boundary from the plurality of boundary candidates obtained through image processing becomes an important issue for improving the inspection accuracy.

The medicine inspection system of the present invention provided to resolve such issues is capable of inspecting each packaging bag for the medicine supplied in a state of a band-shaped packaging bag continuous body lined with packaging bags divided into portions for single doses by packaging paper, and includes an inspection unit at which a packaging bag containing a medicine to be inspected is arranged, a photographing device which photographs a packaging bag positioned at the inspection unit, and an inspection means which inspects a numerical quantity and/or type of a medicine contained in the packaging bag based on an image photographed of the packaging bag to be inspected, wherein the packaging bag continuous body has a boundary formed so as to extend in a width direction of the packaging bag continuous body between adjacent packaging bags, wherein the medicine inspection system further includes a predetermined value acquisition means which acquires a predetermined value for a length of a packaging bag to be inspected; a boundary candidate derivation means for deriving a single boundary candidate or a plurality of boundary candidates assumed as boundaries between the packaging bag to be inspected and other packaging bags adjacent on the upstream side and downstream side in the supply direction of the packaging bag continuous body based on an image photographed of the packaging bag continuous body, the boundary candidates thereof derived respectively as an upstream side boundary candidate and a downstream side boundary candidate; a position information acquisition means for acquiring position information about the upstream side boundary candidate and the downstream side boundary candidate; a candidate value derivation means for deriving a candidate value of a length of a packaging bag to be inspected by implementing calculations based on position information acquired by the position information acquisition means for each combination of candidates including the upstream side boundary candidate and the downstream side boundary candidate; and a boundary stipulation means which selects a candidate value that has approached a predetermined value for the length of the packaging bag to be inspected from amongst the candidate values derived by the candidate value derivation means, and stipulates a combination of the upstream side boundary candidate and the downstream side boundary candidate that together configure the selected candidate value as the boundaries positioned at the upstream side and downstream side of the packaging bag to be inspected.

The medicine inspection system of the present invention implements calculations based on position information for each combination of candidates including the upstream side boundary candidate and the downstream side boundary candidate derived by the boundary candidate derivation means based on an image photographed of the packaging bag continuous body, and can derive a candidate value for the length of the packaging bag to be inspected. Moreover, the boundary stipulation means can select a candidate value closest to a predetermined value for the length of the packaging bag to be inspected from amongst the candidate values for the length of the packaging bag, and can stipulate a combination of the upstream side boundary candidate and the downstream side boundary candidate that together configure the selected candidate value as the boundaries that form the packaging bag to be inspected. Through this, the packaging bag to be inspected can be correctly positioned using the boundaries as a reference, and the inspection accuracy can be further improved, Effect of the Invention According to the present invention, a medicine inspection system capable of appropriately outputting an inspection result while preventing the likes of damages done to a packaging bag and a medicine can be provided.

BRIEF DESCRIPTION OF THE DRAWINGS

FIG. 14A is a diagram showing a state in which the pen tip is inserted in a pen tip insertion part, and FIG. 14B is a diagram showing a state when a stamp is affixed to a packaging bag by the pen.

FIG. 18A is a front elevation view showing the winding and feed device shown in FIG. 17, and FIG. 18B is a left side view of the winding and feed device.

FIG. 19A shows a state when the packaging bag continuous body is secured, and FIG. 19B shows a state when the packaging bag continuous body is being attached or removed.

FIG. 20A shows a state in which a packaging bag has not yet arrived at an inspection unit, and FIG. 20B shows a state in which a packaging bag has arrived at the inspection unit.

MODE FOR CARRYING OUT THE INVENTION

Figure 1:
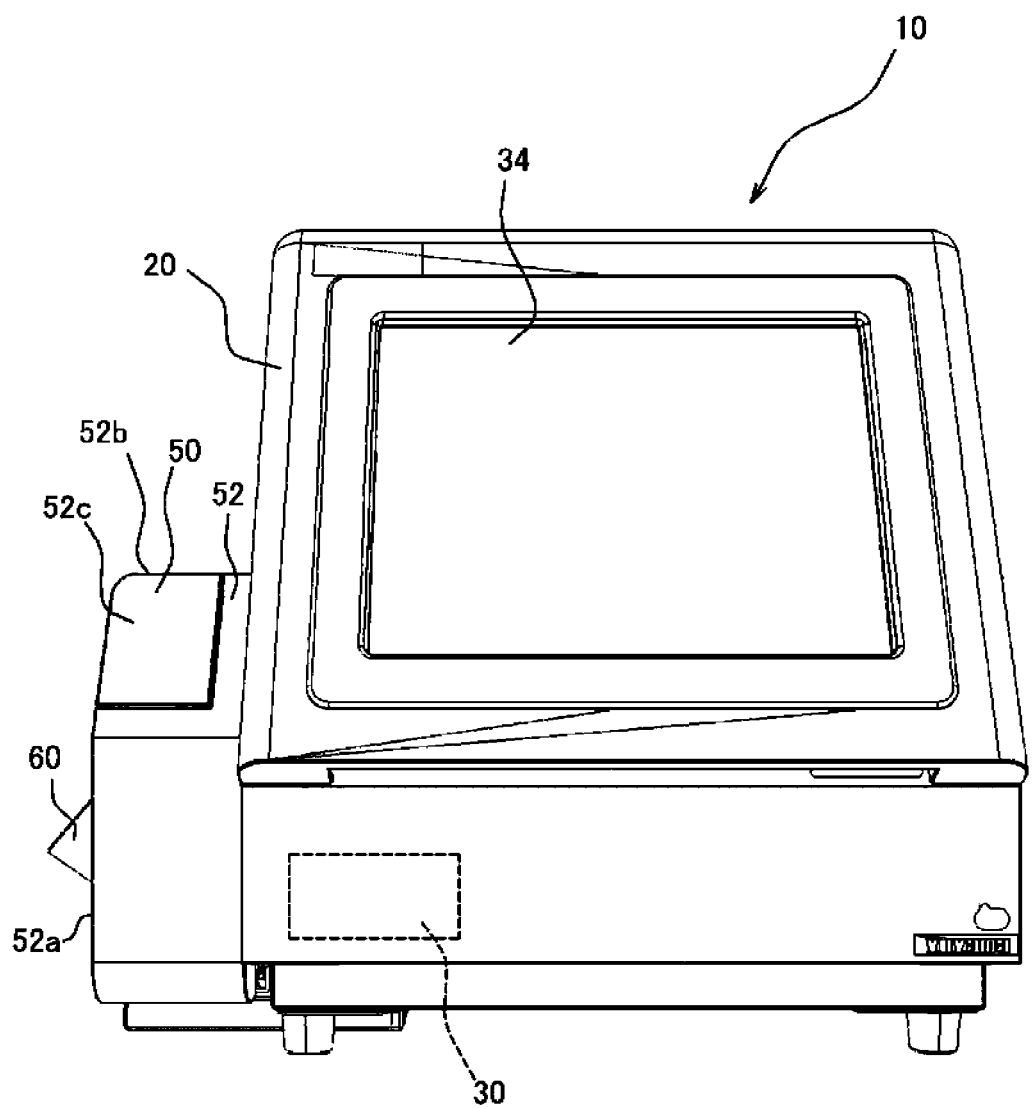
FIG. 1 is a front elevation view showing a medicine inspection system according to one embodiment of the present invention.

A medicine inspection system 10 according to one embodiment of the present invention is described below with reference to the drawings. As shown in FIG. 1, the medicine inspection system 10 performs an inspection to determine if a numerical quantity and type of a medicine is individually packaged according to a prescription within a packaging bag p prepared based on the prescription. The medicine inspection system 10 is provided with an inspection device 20 and a marking device 50.

Figure 2:
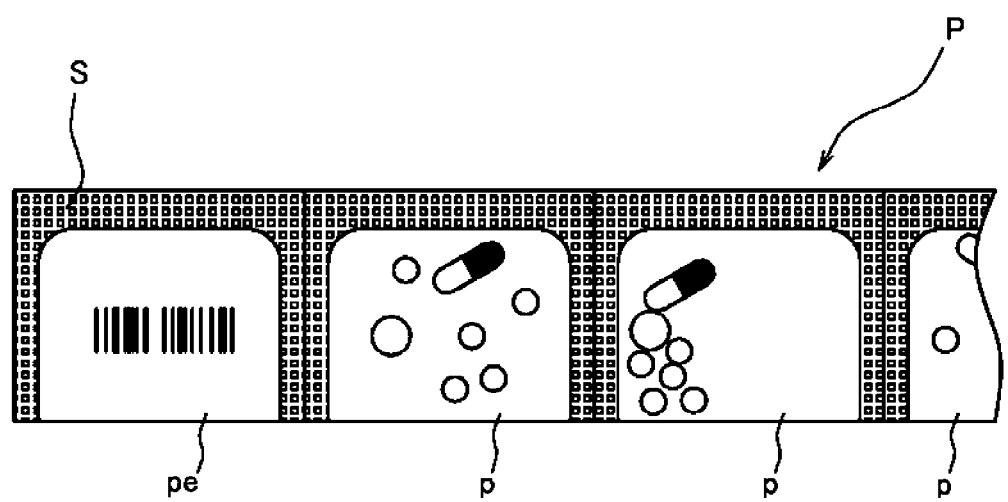
FIG. 2 is a plan view showing one example of a packaging bag continuous body.

With the medicine inspection system 10, the packaging paper is folded into two and superposed, after which the packaging bag p to be inspected is pressure bonded by a technique such as thermal bonding to perform pressure bonding while applying heat to an outer circumference portion as shown in FIG. 2, thereby forming a seal section S and a bag shape. With the medicine inspection system 10 of the present embodiment, each packaging bag p establishing a packaging bag continuous body P in which a plurality of packaging bags P are formed continuously can be inspected sequentially.

The packaging bag continuous body P is formed by folding a band-shaped packaging paper at a roughly center part in the width direction to form a seal section S. The packaging bag continuous body P can contain a medicine in every packaging bag p, but for example, as shown in FIG. 2, the packaging bag continuous body P may contain an empty packaging bag p (hereinafter, "empty package pe") for which a medicine is not packaged in a packaging bag p located at a predetermined position such as packaging bag p at a lead position or an end position. The empty package pe can be used to record information on the packaging bag continuous body P such as a patient's name, name of the medication, the administration method, and the prescription date, or to record a barcode or other identification label that contains a record of such information. Moreover, the seal section S may be such that the surface is flat and smooth over roughly the entire seal section, but it may also be an irregular shape having a plurality of dot-shaped seal arks such as knurling marks from a pressure bonding device (not illustrated).

Figure 3:
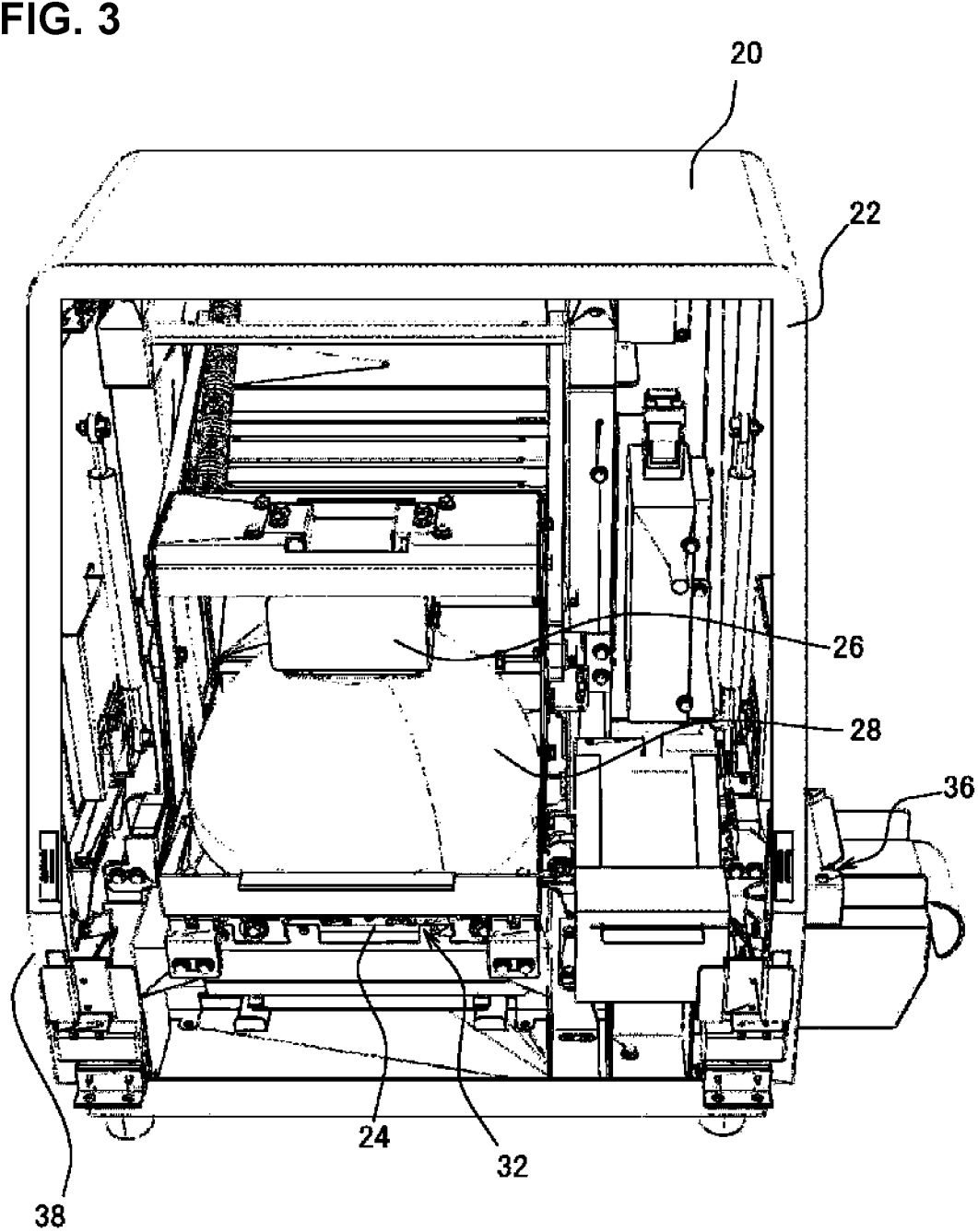
FIG. 3 is a perspective view showing an internal configuration of an inspection device.

The inspection device 20 is a device for deriving a numerical volume and/or quantity of a medicine based on an image obtained by photographing a packaging bag p supplied as the inspection target, and for inspecting whether the volume and/or quantity thereof match the prescription data. The inspection device 20 can feature an appropriate configuration, but for example, a configuration like that shown in FIG. 3 can be adopted. Specifically, the inspection device 20 is provided with a conveyance device 24, a photographing device 26, an illumination device 28, and a control device 30 (see FIG. 1) and the like all within an inspection device main body 22.

The conveyance device 24 can be formed by a conventionally known belt conveyor, roller conveyor, and the like. With the present embodiment, a belt conveyor is adopted as the conveyance device 24. The conveyance device 24 can convey a packaging bag p (packaging bag continuous body P) introduced from an introduction part 36 provided at one side surface (the right side surface in the illustrated example) of the inspection device main body 22 toward a discharge part 38 provided at another side surface (the left side surface in the illustrated example). Moreover, the conveyance device 24 can also position and stop the packaging bag p to be inspected at an inspection unit 32 provided at roughly a center portion of the conveyance path (a roughly center part in the width direction of the inspection device main body 22.

The photographing device 26 is used to photograph a packaging bag p (medicine) positioned at the inspection unit 32, and is arranged at a position facing the inspection unit 32 (vertically upward in the present embodiment). Moreover, the illumination device 28 is used to illuminate the inspection unit 32 when photographing using the photographing device 26, and as with the photographing device 26, the illumination device 28 is arranged at a position further upward than the inspection unit 32. An image (front side illuminated image) of the medicine in a packaging bag positioned at the inspection unit 32 can be obtained by photographing using the photographing device 26 with the illumination device 28 in an ON state.

Moreover, a back side illumination device 29 is provided below (back surface side) the translucent inspection unit 32. An image (backlight image) showing the silhouette of the medicine in the packaging bag positioned at the inspection unit 32 can be obtained by photographing with the photographing device 26 when the illumination device 28 is OFF and the back side illumination device 29 is ON.

The control device 30 can cause photographing to occur with each packaging bag p forming the packaging bag continuous body P positioned at the inspection unit 32 by controlling the operation of the above-described conveyance device 24, photographing device 26, illumination device 28, and back side illumination device 29. Moreover, the control device 30 can derive a numerical volume and numerical quantity of the medicine contained in a packaging bag p based on an image obtained by the photographing device 26. The method for deriving the numerical volume and numerical quantity of the medicine through the control device 30 may be an appropriate method.

Figure 13A:
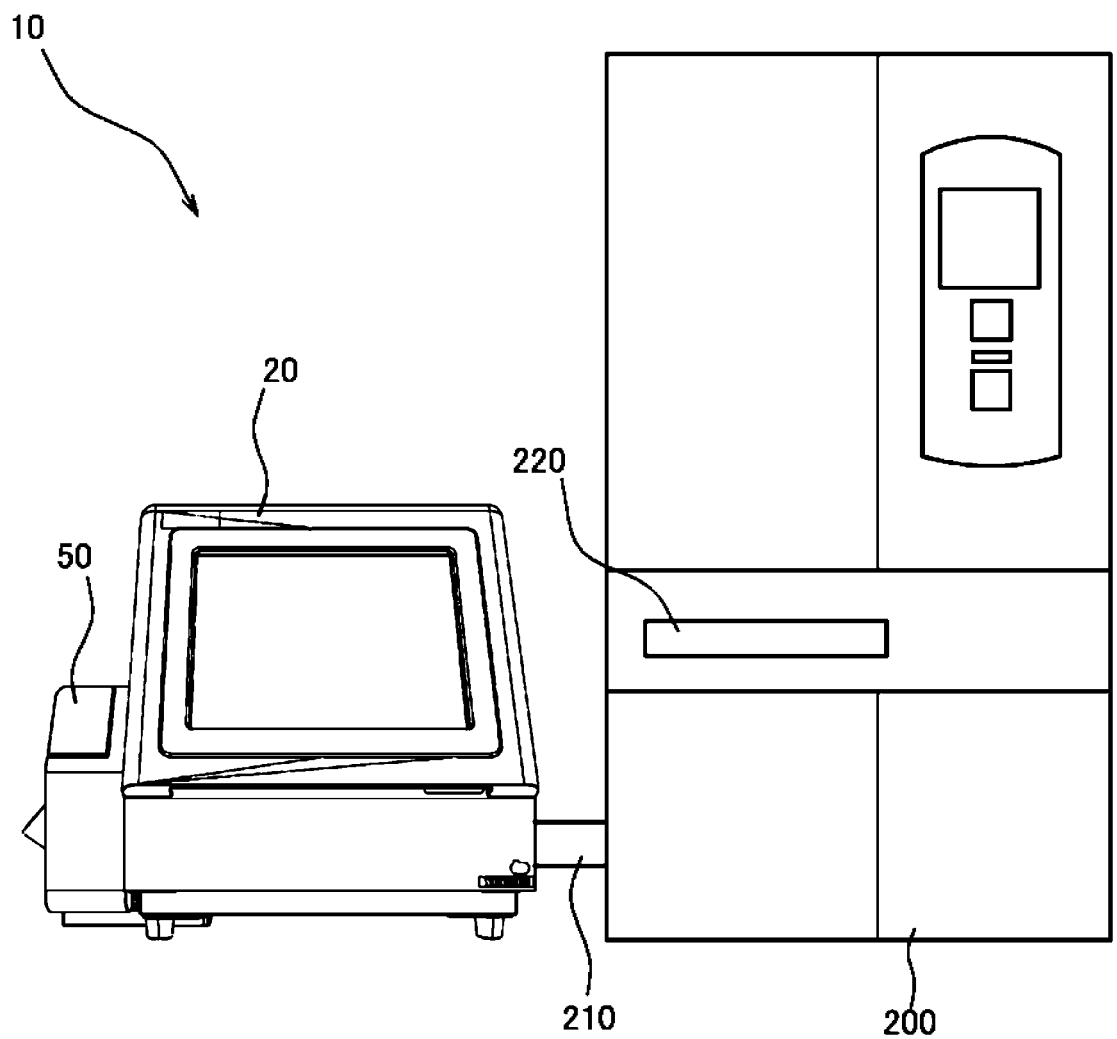
FIG. 13A is a front elevation view showing a modified example of a medicine inspection system.

Furthermore, the control device 30 is capable of implementing an inspection operation by comparing results derived based on an image for each packaging bag p to be inspected with prescription data obtained from the likes of a separately provided medicine dividing and packaging device 200 (see FIG. 13A). The control device 30 can also notify an operator of the inspection results by a method such as displaying the results thereof on a panel 34 (see FIG. 1) provided on the front surface side of the inspection device 20. In addition, data (inspection data) that shows the inspection results can be output to a marking device 50 that will be described in detail below.

The marking device 50 is a device for inscribing the inspection results obtained from the above-described inspection device 20 on a packaging bag. As shown in FIG. 1, the marking device 50 is arranged at the downstream side in the direction of flow of the packaging bag continuous body P (packaging bag p) with respect to the inspection device 20. Namely, the marking device 50 is arranged such that it is adjacent to the discharge part 38 side (left side surface of the illustration) with respect to the inspection device 20.

Figure 4:
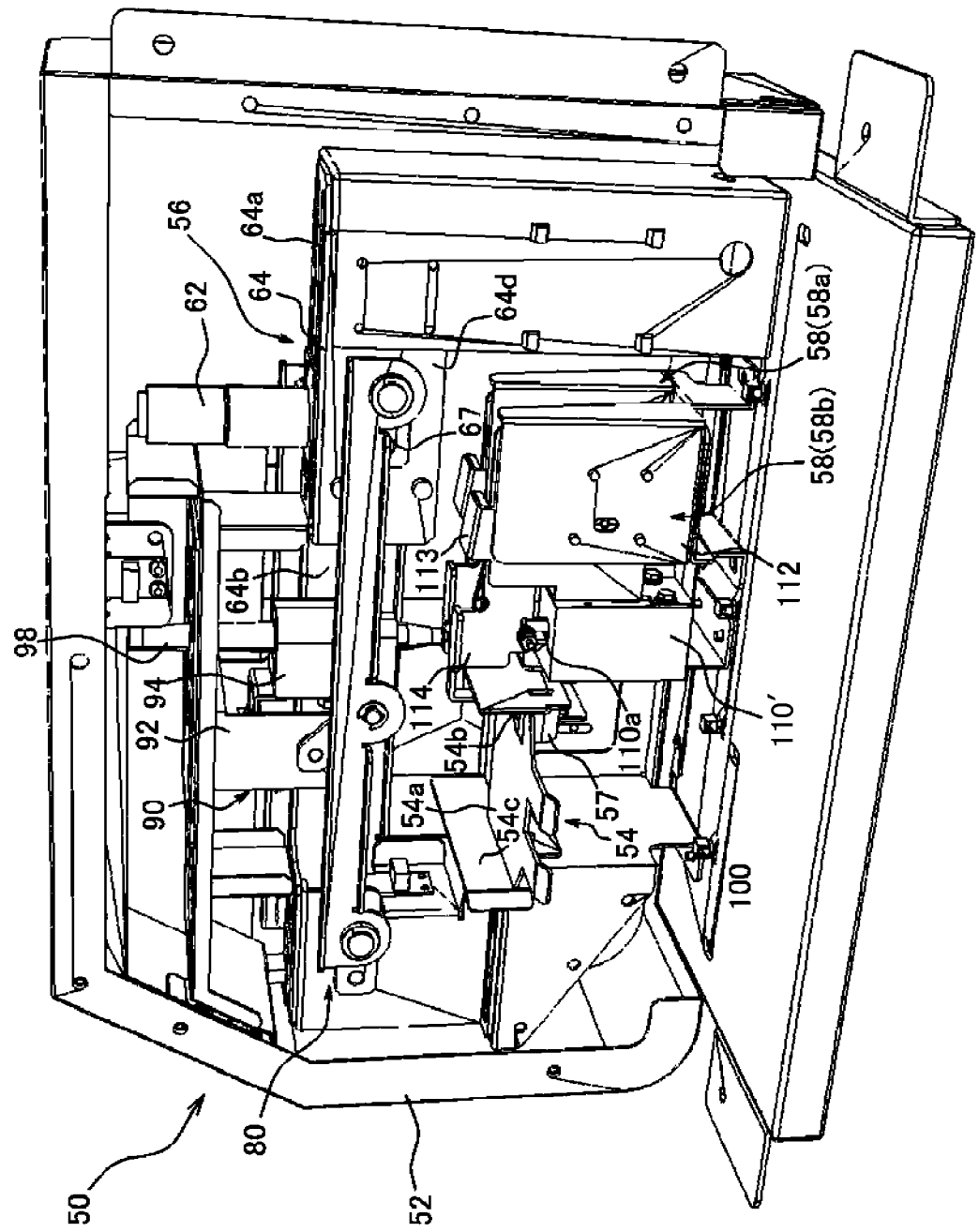
FIG. 4 is a perspective view showing a marking device as viewed from the inspection device side.
Figure 5:
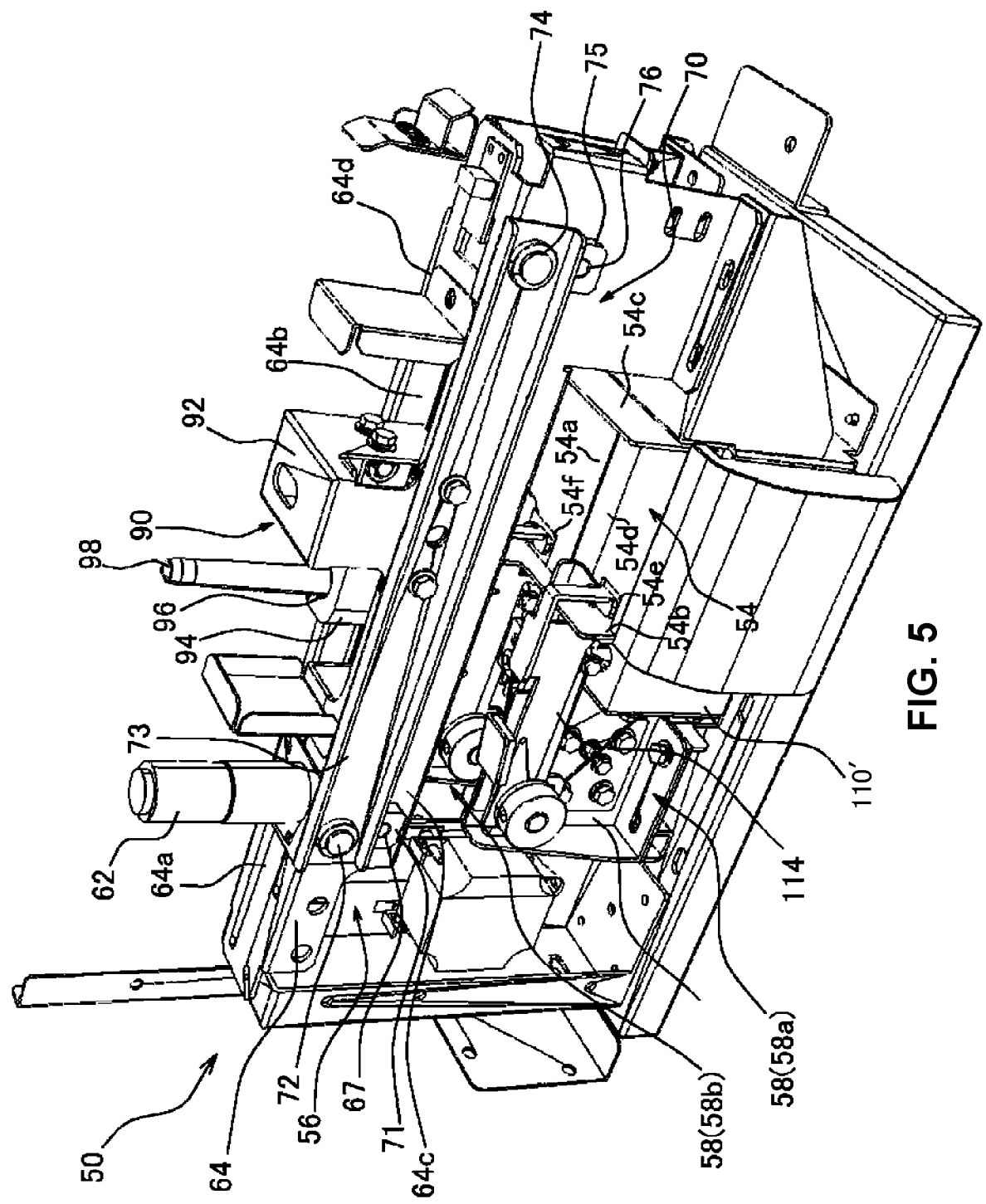
FIG. 5 is a perspective view showing an internal configuration of the marking device as viewed from the discharge side.

As shown in FIG. 4 and FIG. 5, the marking device 50 is provided with a conveyance path 54, a plotter 56, a fixing apparatus 58, and an identification device 59 all within a marking device main body 52. As shown in FIG. 1, the marking device main body 52 has a box-shaped exterior form and takes on a shape that is formed such that a discharge part 38 for discharging a packaging bag p (packaging bag continuous body P) bulges at a side surface 52a. The marking device main body 52 opens downward at the discharge part 38, and is capable of discharging a packaging bag p (packaging bag continuous body P) introduced from the inside in a downward direction along the side surface 52a. A lid part 52c capable of opening and closing via a hinge is provided at a top surface 52b of the marking device main body 52, and by opening the lid part 52c of the marking device main body 52, operations such as replacing a pen 98 for the plotter 56, which will be described in detail below, can be performed.

The conveyance path 54 is formed in the marking device main body 52 so as to be continuous to the discharge part 38 of the inspection device 20. As shown in FIGS. 4, 5, 11, 12, and the like, the conveyance path 54 has a floor part 54a and side walls 54b and 54c. The floor part 54a is formed by a flat plate having a width that is equivalent or greater than that of the packaging bag p (packaging bag continuous body P) discharged from the discharge part 38 of the inspection device 20.

The plotter 56 is a device that outputs a dot-shaped plot through a pen 98 onto a packaging bag p that passes through the conveyance path 54. As shown in FIGS. 4 through 8, the plotter 56 is provided with a motor 62 that serves as the power source and a support 64. The plotter 56 is configured such that a first link mechanism 70 and a second link mechanism 80 can be attached so as to be operable to the support 64, and such that a pen holder 90 is connected to the first link mechanism 70 and the second link mechanism 80.

Figure 6A:
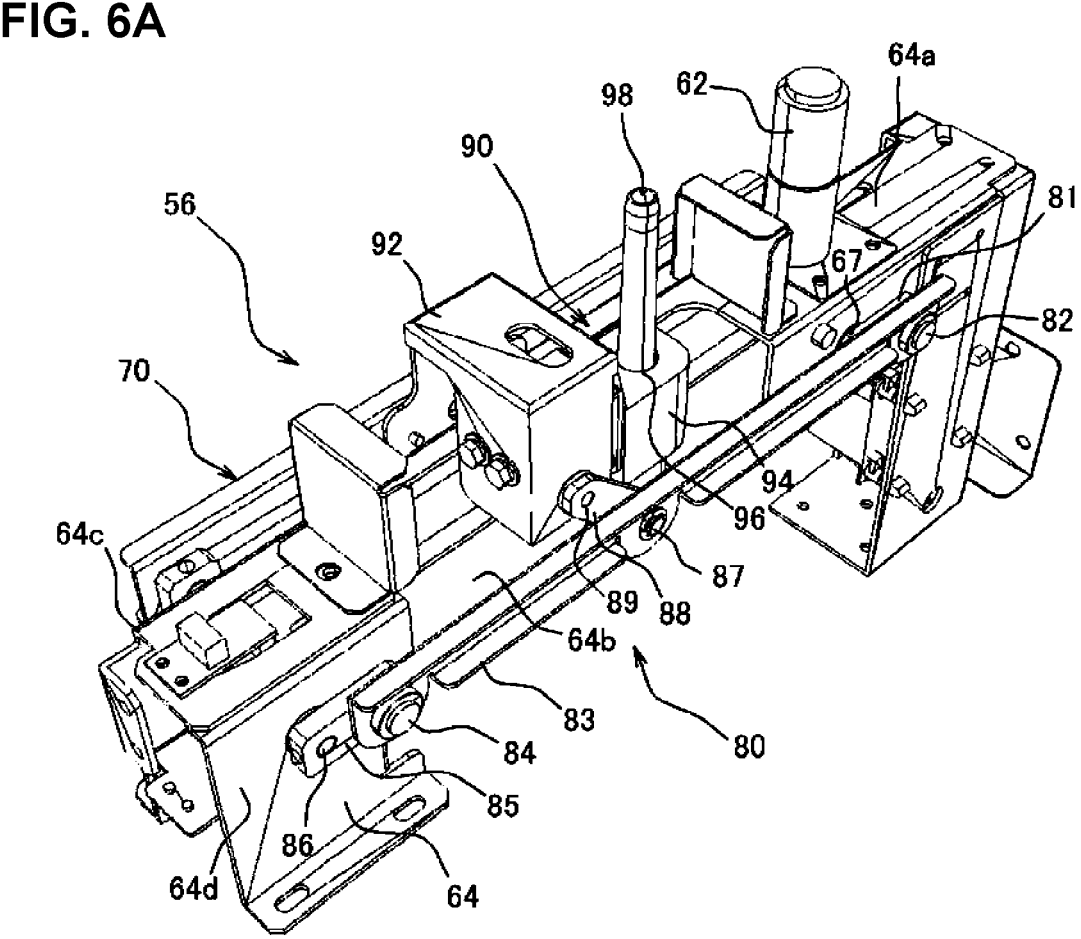
FIG. 6A is a perspective view showing a plotter provided with a marking device.
Figure 6B:
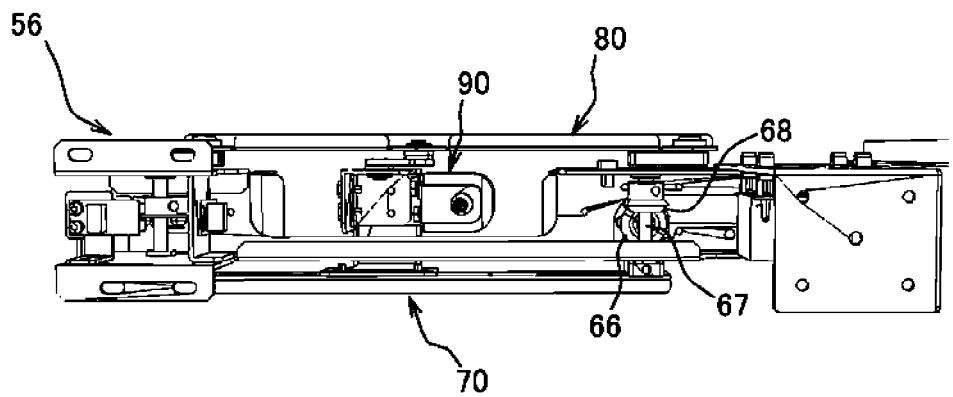
FIG. 6B is a bottom view of the same.

As shown in FIGS. 4 and 5, the support 64 is a structure that is formed so as to straddle the conveyance path 54, and as shown in FIGS. 5 and 6, a notch 64b is provided at a top surface 64a of the support 64 at a region upward with respect to the conveyance path 54. In this manner, the pen holder 90 is capable of traveling in the width direction of the conveyance path 54. Moreover, the motor 62 is installed at a position adjacent to the notch 64b at one side in the width direction of the conveyance path 54. A rotating shaft of the motor 62 is inserted roughly perpendicular to the top surface 64a from above toward the inside of the support 64, and as shown in FIG. 6B, a bevel gear 66 is connected to the rotating shaft of the motor 62. The bevel gear 66 meshes with a bevel gear 68 fixed by a first pin 67 mounted extending between a front surface 64c and a back surface 64d of the support 64. Therefore, by operating the motor 62, transmission can be implemented to the first pin 67 via the bevel gears 66 and 68 to thereby cause the first pin 67 to rotate.

Figure 7:
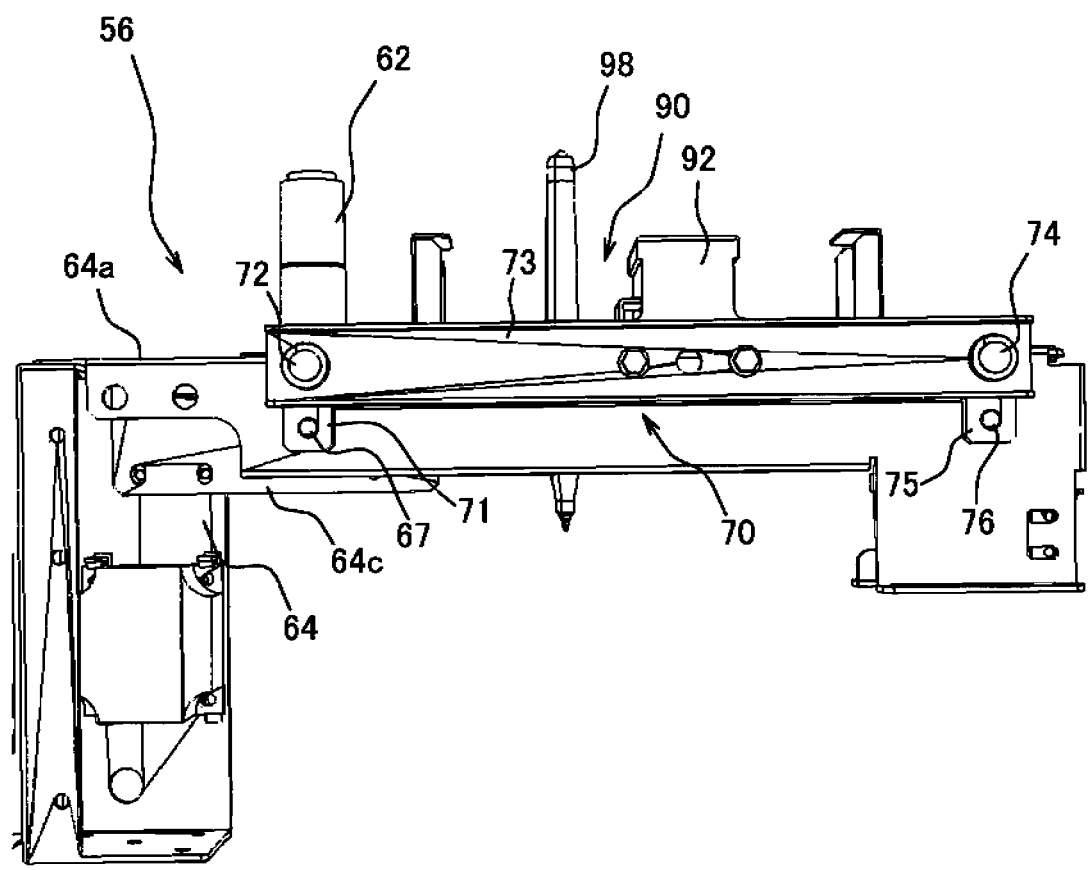
FIG. 7 is a front elevation view of the plotter shown in FIG. 6A.

The first link mechanism 70 is a link mechanism capable of operating at the front surface 64c side of the support 64. As shown in FIGS. 5 and 7, the first link mechanism 70 is provided with a first arm 71 connected to a protruding part of the first pin 67 protruding at the front surface 64c side, a second arm 73 connected to the first arm 71 via a second pin 72, and a third arm 75 connected to the second arm 73 via a third pin 74. The end of the third arm 75 is connected to the support 64 via a fourth pin 76.

The first arm 71 and the third arm 75 are arranged in a roughly parallel manner. In addition, the first pin 67 and the fourth pin 76 are arranged at roughly the same height, and are respectively provided through the conveyance path 54 at one side and the other. The second arm 73 is installed so as to extend roughly horizontally at the upper side of the conveyance path 54, and a side surface of the pen holder 90, which will be described in detail later, is secured to a middle portion of the second arm 73. The first link mechanism 70 operates by causing the motor 62 to operate and the first pin 67 to rotate. When the first link mechanism 70 is operated, the second arm 73 and the pen holder 90 attached to the middle of the second arm 73 move in the width direction of the conveyance path 54 in conjunction with movement in the vertical direction.

Figure 8:
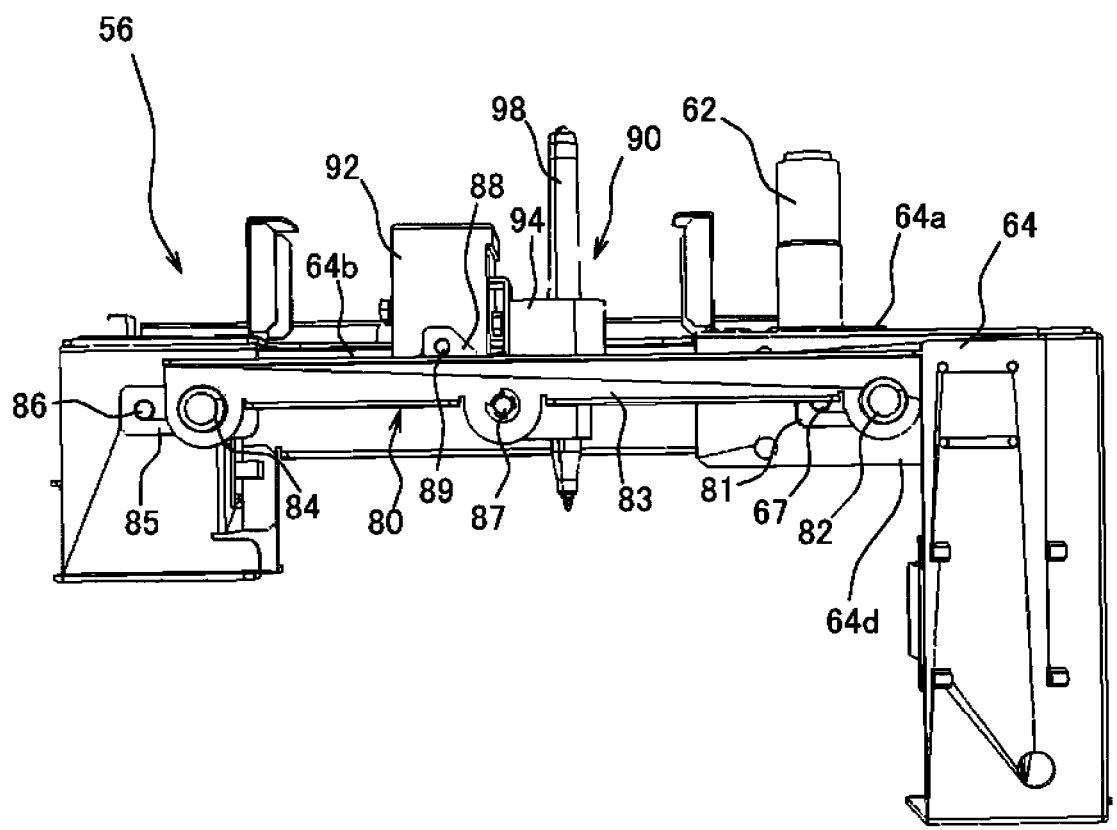
FIG. 8 is a back view of the plotter shown in FIG. 6A.

The second link mechanism 80 is a link mechanism that is capable of operating at a side opposite the first link mechanism 70, or in other words, at the back surface 64d side of the support 64. As shown in FIGS. 6 and 8, the second link mechanism 80 is provided with a first arm 81 connected to a part of the first pin 67 that is protruding to the back surface 64d side, a second arm 83 connected via a second pin 82 to the first arm 81, and a third arm 85 connected via a third pin 84 to the second arm 83. The end of the third arm 85 is connected via a fourth pin 86 to the support 64. Moreover, a fourth arm 88 is connected via a fifth pin 87 to a middle portion of the second arm 83. The end of the fourth arm 88 is connected by a sixth pin 89 to a side surface of the pen holder 90, which will be described in detail later.

The first arm 81 and the third arm 85 are arranged in a roughly parallel manner. Furthermore, the first pin 67 and the fourth pin 86 are installed at roughly the same height, and are respectively provided through the conveyance path 54 at one side and the other. The second arm 83 is installed so as to extend roughly horizontally at the upper side of the conveyance path 54, and similar to the first link mechanism 70, the second link mechanism 80 is operated by causing the first pin 67 to rotate by operating motor 62. When the first pin 67 rotates, the second arm 83 moves in the width direction of the conveyance path 54 in conjunction with movement in the vertical direction. By causing the second arm 83 to operate in this manner, the pen holder 90 connected to the second arm 83 via the fourth arm 88 can be caused to move in the width direction of the conveyance path 54 in conjunction with movement in the vertical direction.

The pen holder 90 includes a connection part 92 connected to the first link mechanism 70 and the second link mechanism 80, and a retention part 94 attached integrally to the connection part 92. A pen insertion hole 96 communicating in the vertical direction is provided at the retention part 94, and the pen 98 can be inserted into the pen insertion hole 96 and retained in a manner such that it can be freely inserted and removed. The pen 98 may be any type of pen, where for example, a pen that uses an ink that becomes invisible when heat is applied may be used. In this manner, a stamp applied by the pen 98 can be deleted as necessary.

Figure 11:
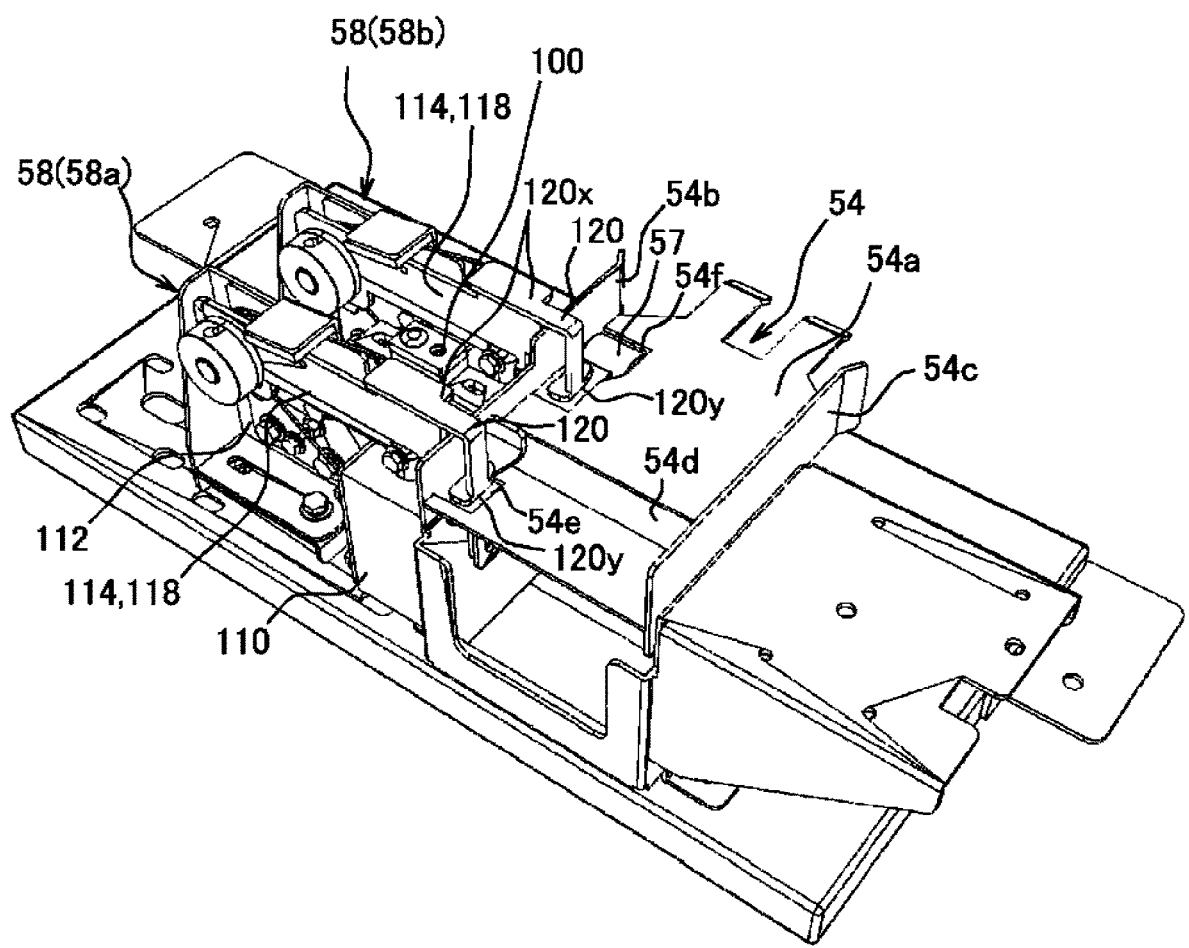
FIG. 11 is a perspective view showing a conveyance path and fixing apparatus arranged below a plotter.

A pen tip insertion part 100 in which a tip end of the pen 98 can be inserted is provided at a position in the range of movement of the pen holder 90 according to the first link mechanism 70 and the second link mechanism 80, the position thereof being a position at which the tip end of the pen 98 arrives (also referred to hereafter as the "standby position") and being on the installation side of the motor 62 (see FIG. 11). In this manner, during the time that the pen 98 is in standby at the standby position, drying of the tip end of the pen 98 can be prevented. Moreover, when the pen holder 90 is moved to a side opposite that of the standby position within the range of movement of the pen holder 90 according to the first link mechanism 70 and the second link mechanism 80, the tip end of the pen 98 arrives at a position corresponding to the seal section S of the packaging bag p passing through the conveyance path 54 (also referred to hereafter as the "plot position"). Therefore, by causing the pen holder 90 to move such that the pen 98 arrives at the plot position, a stamp can be affixed by a pen 98 to the seal section 5 of the packaging bag p.

Figure 9:
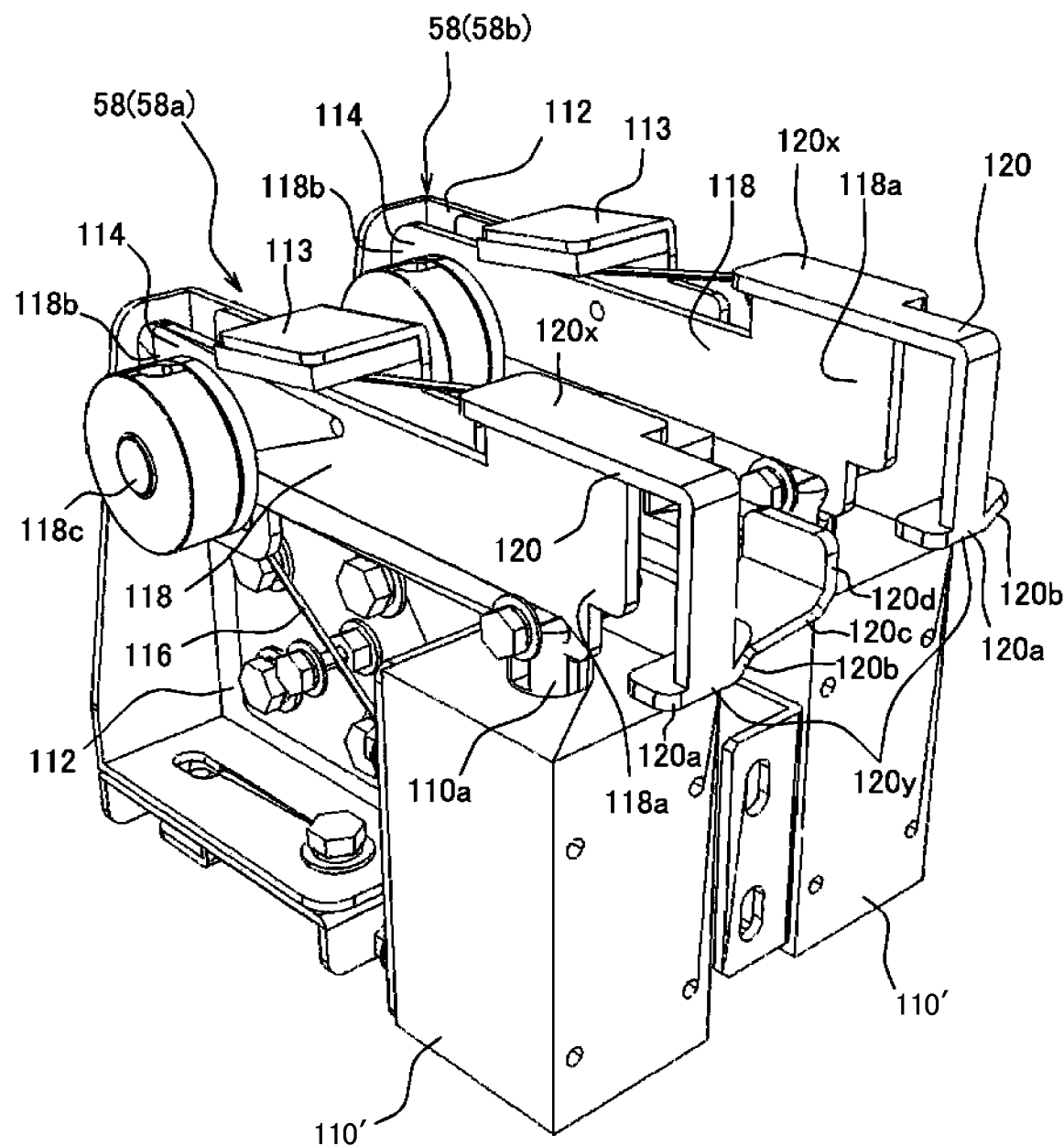
FIG. 9 is a perspective view showing a fixing apparatus provided with a marking device.
Figure 10:
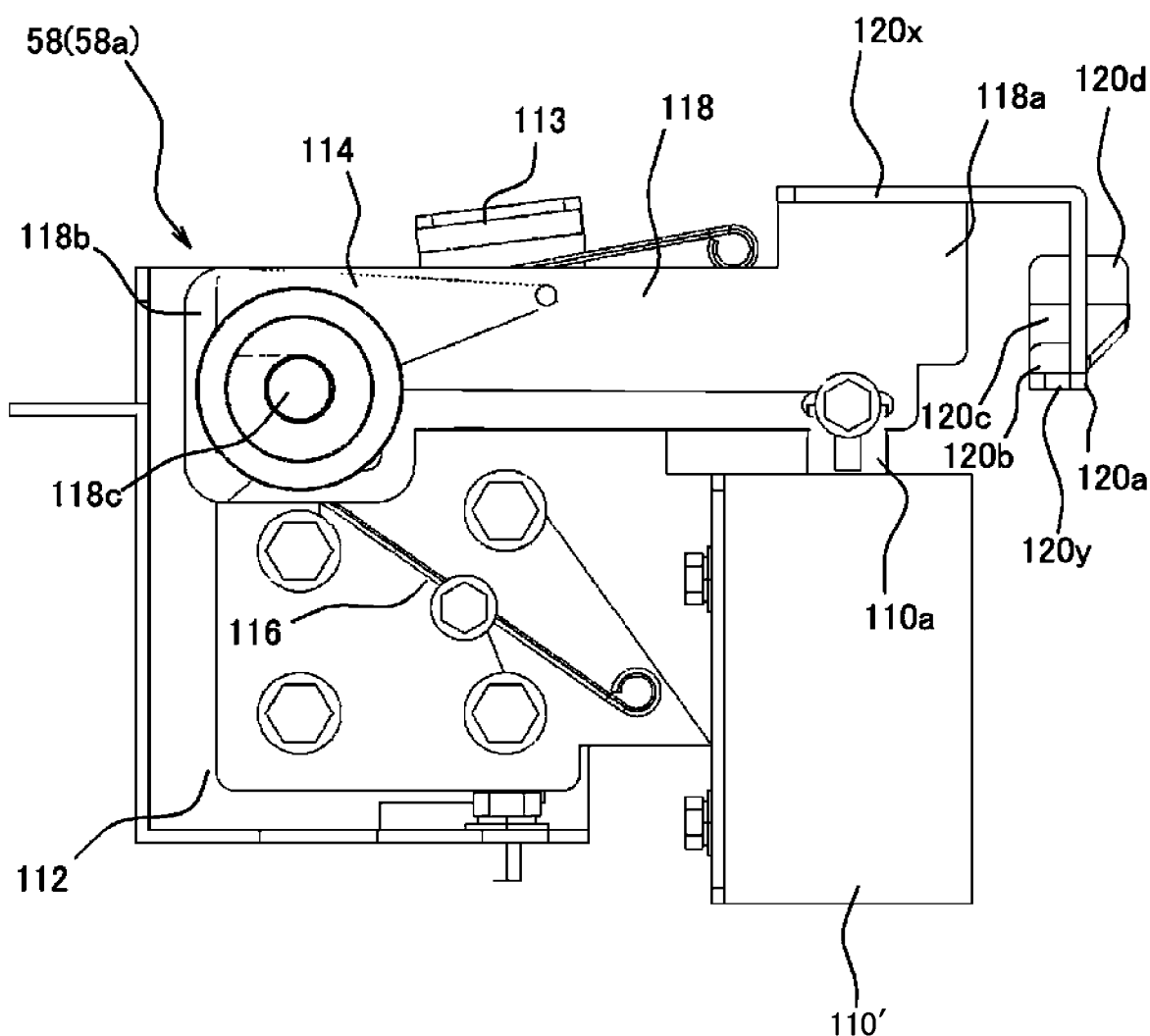
FIG. 10 is a front elevation view showing a fixing apparatus provided with a marking device.

As shown in FIGS. 4, 5, 11, and the like, the fixing apparatus 58 is provided at a position adjacent to the conveyance path 54. Two fixing apparatuses 58 are installed aligned next to each other in the conveyance path 54 in the conveyance direction of the packaging bag p (packaging bag continuous body P). The fixing apparatus 58 is used to fix the packaging bag p (packaging bag continuous body P) such that it does not undergo a positional shift when a stamp is being affixed by the pen 98. As shown in FIGS. 9 and 10, the fixing apparatus 58 is provided with a cylinder device 110' that operates as a driving source, a supporting wall 112, an actuating piece 114 connected to the cylinder device 110', and a spring 116 which biases the actuating piece 114 upward.

The supporting wall 112 is a flat plate shaped wall surface arranged so as to be roughly orthogonal to the side wall 54b in a lateral direction of the side wall 54b of the conveyance path 54. The actuating piece 114 has an actuating piece main body 118 and a pressing part 120. The actuating piece main body 118 is a flat plate shaped member arranged along the supporting wall 112. A shaft 110a of the cylinder device 110' is connected at a lower end side of an end of the side wall 54b side of the actuating piece main body 118 (hereinafter, also referred to as "tip end 118a"). Moreover, the actuating piece main body 118 is supported so as to be freely rotatable with respect to the supporting wall 112 by a support shaft 118c at an end on a side opposite the tip end 118a (hereinafter, also referred to as "base end 118b"). The actuating piece 114 is biased upward by the spring 116, and is continuously abutting an abutting piece 113 formed by bending up a top end of the supporting wall 112. The actuating piece 114 can cause the tip end 118a of the actuating piece main body 118 to descend by causing the shaft 110a to move backwards in a downward direction by conducting electricity to the cylinder device 110'.

The pressing part 120 is a part formed so as to continue to an upper side of the tip end 118a of the actuating piece main body 118. The pressing part 120 is broadly divided into a pressing part main body 120x formed in a roughly L-shape, and a connecting part 120y formed so as to continue to the pressing part main body 120x. The pressing part main body 120x is formed so as to straddle the side wall 54b, extend from the outside of the conveyance path 54 to the inside, and descend roughly vertically downward from above along the side wall 54b at the inside of the conveyance path 54.

Figure 12:
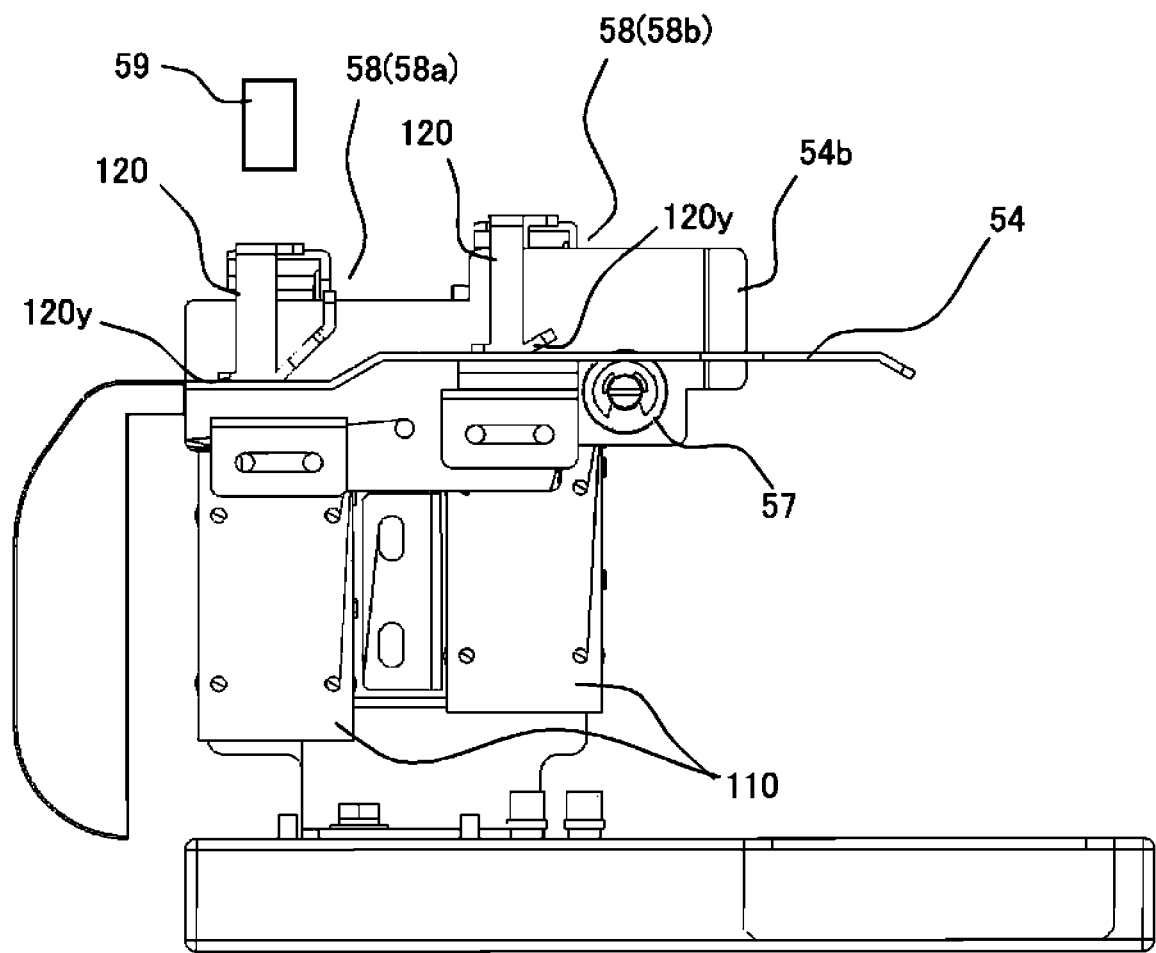
FIG. 12 is a side view showing the conveyance path as viewed from the side.

The identification device 59 is a sensor for detecting an affixed stamp (hereinafter, also referred to as "check completed marking") that indicates that an inspection check was performed for a packaging bag p (packaging bag continuous body P) passing through the conveyance path 54. The identification device 59 may be any type of device as long as it is capable of detecting a check completed marking. As shown in FIG. 12, the identification device 59 is installed so as to be capable of detecting a packaging bag p (packaging bag continuous body P) passing through the conveyance path 54 from above. Moreover, the identification device 59 is arranged further downstream than the marking device 50.

With the medicine inspection system 10, operational control is also implemented for each part of the marking device 50 by the control device 30 equipped with the abovementioned inspection device 20.

Operation of the Medicine Inspection System 10

Next, operation of the medicine inspection system 10 will be described with focus centered on characteristic parts. The medicine inspection system 10 derives the numerical quantity and type of medicine packaged in each packaging bag p by first using the control device 30 to cause each part of the inspection device 20 to operate. The control device 30 inspects the derived numerical quantity and type of medicine by comparing that information with the prescription data.

The control device 30 displays the inspection results of each packaging bag p on an appropriate panel 34. If the inspection results are not good, the control device 30 also causes the marking device 50 to operate, and thereby affixes a stamp to the seal section S of the packaging bag p determined to not pass the inspection. More specifically, when a packaging bag p determined to not pass the inspection approaches the conveyance path 54 of the marking device 50, the fixing apparatuses 58, 58 operate. Through this, the packaging bag p is fixed at the conveyance path 54. Next, the motor 62 of the plotter 56 is operated, and the first link mechanism 70 and the second link mechanism 80 are operated. Through this, the pen holder 90 moves over the side wall 54b and toward the conveyance path 54 side, and a dot-shaped stamp (hereinafter, also referred to as the "failed inspection marking") is affixed to the seal section S by the pen 98. When the failed inspection marking is affixed by the pen 98, the motor 62 rotates in reverse, and the first link mechanism 70 and the second link mechanism 80 are operated in a reverse direction. Through this, the pen holder 90 reaches a state at which it is moved away from the conveyance path 54. In this state, the tip end of the pen 98 is housed in the pen holder 90, and is maintained in a state such that it does not dry.

Moreover, with the medicine inspection system 10, a stamp (check completed marking) which differs from the failed inspection marking that is affixed when the inspection results are not good is affixed to an empty packaging bag p (empty package pe) provided at the lead position of the packaging bag continuous body P. More specifically, when an empty package pe approaches the conveyance path 54, the fixing apparatuses 58 and 58 remain in a non-operational state, wherein the plotter 56 operates, and the tip end of the pen 98 is made to contact the seal section S of the empty package pe. Because the fixing apparatuses 58, 58 are not operating, the empty package pe advances to the downstream side with the pen 98 contacting the seal section S. Therefore, a linear marking (check completed marking) is affixed to the seal section S by the pen 98. The check completed marking not only functions as a stamp to indicate that the packaging bag continuous body P has been inspected, but can also be used to check if the pen 98 is in a an operational state without having the likes of an ink shortage. The presence or absence of a check completed marking on an empty package pe can not only be confirmed visually by an operator but also by the control device 30 based on the detection results of the identification device 59.

With the medicine inspection system 10 of the present embodiment, a stamp that indicates the inspection results can be output by the marking device 50 onto the seal section S present at a position that is separated from a region in which a medicine is contained. Moreover, because the seal section S is a portion that is obtained by superposing and pressure bonding the packaging paper, it is stronger than the portion containing the medicine. Hence, damage to the packaging bag p and medicine resulting from impact when the stamp is affixed can be prevented, and the stamp can be easily and reliably output.

If the seal section S configuring the packaging bag p has a plurality of dot-shaped seal marks, problems such as the failed inspection marking disappearing through friction can be prevented by affixing the dot-shaped failed inspection marking in the seal section S using the marking device 50 as described above. Moreover, by affixing a dot-shaped failed inspection marking using the marking device 50 to the seal section S on which a plurality of dot-shaped seal marks are formed, a state in which the failed inspection marking notably protruding at the seal section S can be prevented, and a state in which a pharmacist or other operator performing a check can adequately determine the failed inspection marking can be achieved. Through this, damage to the external appearance of the packaging bag p can be prevented, and a failed inspection marking can be affixed in a state that is adequate for checking by an operator. Note that medicine inspection system 10 of the present embodiment is configured with the likes of a dot-shaped seal marks at the seal section 5, and it goes without saying that the system thereof can accommodate not only a packaging bag p having a surface of the seal section S that is an uneven shape, but also a packaging bag p having a surface of the seal section S that is smooth.

With the medicine inspection system 10 of the present embodiment, a failed inspection marking is inscribed at the seal section S on the condition that the inspection results are not good, and if the inspection results are good, a stamp in not affixed in particular. In this manner, the frequency at which a stamp is affixed to the seal section S by the marking device 50 is minimized, and the processing speed can be accelerated. Note that with the present embodiment, an example was presented in which a stamp (failed inspection marking) is affixed by the marking device 50 only for a case in which the inspection results are not good, but the present invention is not limited thereto, and a stamp that differs from the failed inspection marking may also be affixed when the inspection results are good.

Moreover, with the present embodiment, although an example was presented in which a dot-shaped stamp is affixed as a failed inspection marking and a linear stamp is affixed as a check completed marking by the medicine inspection system 10, the present invention is not limited thereto, and any type of stamp may be affixed. Moreover, the check completed marking may also be affixed at a position outside the seal section S.

By outputting a stamp (check completed marking) that differs from the stamp that indicates the inspection results onto the empty package pe provided at the lead position of the packaging bag continuous body P as with the present embodiment, a determining that an inspection was performed for each of the series of packaging bags p forming the packaging bag continuous body P containing the empty package pe thereof can be made. Furthermore, a problem with the marking device 50 such as an ink shortage of pen 98 running can be determined in advance based on the presence or absence of a check completed marking.

Note that the empty package pe to which the check completed marking is affixed does not necessarily have to be provided at the lead position of the packaging bag continuous body P, and it may be provided at a rear end or middle part of the packaging bag continuous body P. If a check completed marking is affixed to an empty package pe at the rear end or middle part of the packaging bag continuous body P, problems such as an ink shortage of pen 98 cannot be identified in advance, but the determining that an inspection has been completed can be easily implemented.

Moreover, with the present embodiment, an example in which a check completed marking was affixed to an empty package pe was presented, but the present invention is not limited thereto, and a configuration for which a check completed marking is not affixed may be adopted. By adopting such a configuration, the operation of the medicine inspection system 10 can be further simplified. Moreover, the check completed marking affixed to the empty package pe is not limited to the marking described above, and a mold of a specific shape or the like may be stamped, and formed.

The medicine inspection system 10 of the present embodiment is provided with an identification device 59 that is capable of identifying the presence or absence of a check completed marking on an empty package pa Through this, the occurrence of a problem such as ink shortages in the marking device 50 can be determined based on the non-detection of a check completed marking on an empty package pe without having to rely on visual confirmation by an operator. Note that in the present embodiment, an example in which the medicine inspection system 10 was provided with an identification device 59 was presented, but the present invention is not limited thereto, and a configuration that does not provide an identification device 59 may also be adopted.

As described above, with the medicine inspection system 10 of the present embodiment, a pen 98 attached to a marking device 50 is capable of writing with ink which can be made invisible by applying heat. Therefore, after an inspection by the medicine inspection system, if there is a desire to make the stamp that was affixed to a packaging bag p by the marking device 50 invisible before the packaging bag p is handed to a patient, heat can be applied to thereby render the stamp invisible. Note that the pen 98 used by the medicine inspection system 10 may be any type of pen such as, from the likes of an oil-based or water-based felt-tip pen, ball pen, or marker pen. The pen 98 may use ink that becomes visible when exposed to ultraviolet light or another light other than visible light, or the pen 98 may be a pen that affixes a stamp which can be confirmed under a black light or other special light source. In this manner, a stamp that can be reliably confirmed visually by an operator or the like can be affixed to a packaging bag p without being noticed by a patient in ordinary environments.

The above-described medicine inspection system 10 features a configuration that combines an inspection device 20 and a marking device 50, but the present invention is not limited thereto. More specifically, as shown in FIG. 13A, a configuration may be adopted in which a medicine dividing and packaging device 200 capable of individually packaging a medicine in accordance with a prescription in single package portions is arranged upstream from the inspection device 20, and in which the space between the medicine dividing and packaging device 200 and the inspection device 20 is connected such that a packaging bag p (packaging bag continuous body P) can be delivered. Moreover, in order to enable a connection with an existing medicine dividing and packaging device 200, a configuration provided with a delivery unit 210 which connects the inspection device 20 and the medicine dividing and packaging device 200 may also be adopted for the medicine inspection system 10. By enabling the delivery of a packaging bag p (packaging bag continuous body P) between the inspection device 20 and the medicine dividing and packaging device 200 in this manner, the steps from the individual packaging of a medicine to the inspection thereof can be implemented in a continuous flow, and the time and labor required to perform the series of tasks can be minimized.

Moreover, if coordinated operation of the medicine inspection system 10 with the medicine dividing and packaging device 200 is enabled, an operation command may be output from the control device 30 to the medicine dividing and packaging device 200 such that a packaging bag p for which the inspection result was not good is specified, and an operation of re-packaging an individual package of the medicine corresponding to the packaging bag p that failed the inspection can be automatically performed. Moreover, if an operator determines visually that an individual package defect has occurred, a re-packing operation of individual packages corresponding to the portion that was found to be defective can be implemented by the medicine dividing and packaging device 200 by specifying the defective packaging bag p. By adopting such a configuration, a failed inspection marking can be made with the marking device 50 on a packaging bag p for which the inspection results were not good to arouse attention, and the re-packaging of individual packages corresponding to those that were found to fail the inspection can be automatically implemented, thereby further improving convenience.

Moreover, if a packaging bag p which is determined to be defective in terms of individual packaging based on inspection results obtained automatically by the inspection device 20 or on a visual inspection by an operator exists, a journal paper may be output to indicate that a defective packaging bag p exists. Moreover, if a journal paper that indicates the presence of a defective packaging g bag p is output, a barcode or other identification symbol may be used to specify the packaging bag p that was determined to be defective in terms of the individual packaging, and re-packing of an individual package packaged with the defective packaging bag p can be implemented by reading the likes of the printed identification symbol at the medicine dividing and packaging device 200 side. By adopting such a configuration, attention can be aroused regarding the implementation of a failed inspection marking by the marking device 50 on the defective packaging bag p, and the efficiency for the re-packaging operation for the defective packaging bag p can be improved.

Figure 13B:
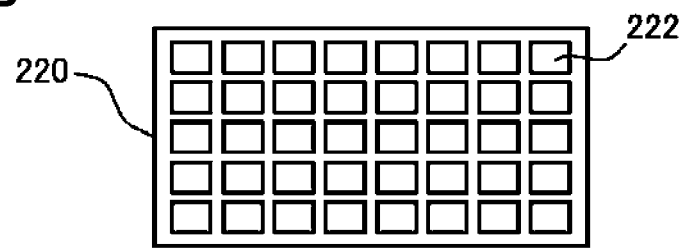
FIG. 13B is a plan view of a manual distributing device.

Moreover, as described above, when re-packaging is performed based on information printed on the journal paper, and re-supplying the medicine that is not stored regularly in the main body of the medicine dividing and packaging device 200 is done using a device that manually supplies a medicine (namely, the likes of a manual distributing device 220 (see FIGS. 13A and 13B), a distributing position of the medicine in the above-described manual scattering device 220 can be printed on the journal paper. More specifically, as shown in FIG. 13B, the manual distributing device 220 is provided with a plurality of manual distributing grid cells 222, and by manually inserting a medicine into a predetermined manual distributing grid cell 222, the medicine can be dispensed one package at a time for individual packaging. Therefore, by printing the distributing position of the medicine on the journal paper, the manual supply operation of the medicine can be performed smoothly, and mistakes in the supply operation can be prevented. Furthermore, if the medicine dividing and packaging device 200 is a device that supports not only the automatic dispensing of a medicine, but also manual dispensing, a notification can be dispatched by printing information about the medicine to be manually dispensed on the journal or displaying the information on a display device provided with the medicine dividing and packaging device 200. Accordingly, by adopting a configuration like that described above, convenience can also be improved for cases in which the medicines that must be re-packaged include a medicine for which dispensing must be performed manually.

As described above, in order to prevent the ink of the pen 98 from drying out at the marking device 50, a pen tip insertion part 100 is provided at a side of the conveyance path 54, and during the waiting period for marking, the tip end of the pen 98 is inserted into the pen tip insertion part 100. Furthermore, in order to prevent drying of the pen 98, a mechanism capable of applying a pressing force in a direction of pressing the pen 98 toward the pen tip insertion part 100 (direction from the top to the bottom in the diagram), or the like, is preferably provided. Moreover, when the pressing force toward the packaging bag p side becomes excessively high when affixing a stamp to the packaging bag p using the pen 98, the tip end of the pen 98 (pen tip) could become crushed.

Figure 14A:
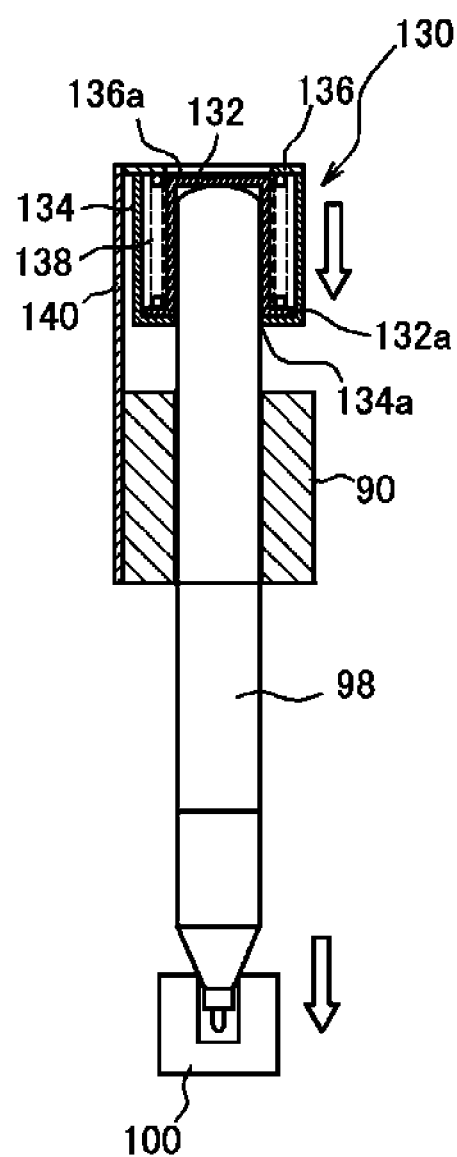
FIGS. 14A and 14B are the conceptual diagram showing a pen holding mechanism.
Figure 14B:
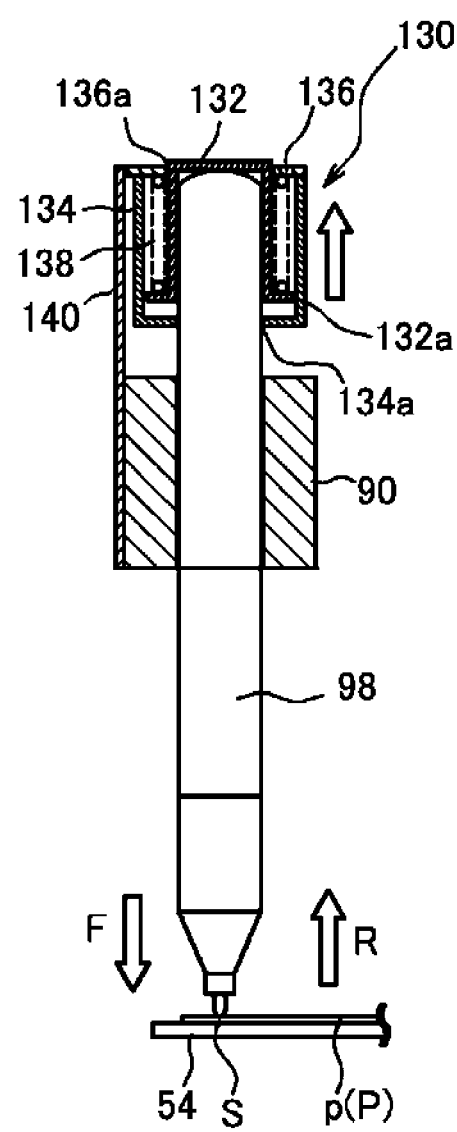

In order to resolve the abovementioned problem, for example, a configuration provided with a pen holding mechanism 130 as shown in FIG. 14A and FIG. 14B may be adopted. More specifically, the pen holding mechanism 130 includes a pen cap 132, a cap receiving member 134, a top plate 136, and a spring 138. The pen cap 132 is a cap-shaped member that can be fitted onto the rear end (end on the top side in the figure) of the pen 98. The pen cap 132 is a tube-shaped body with a bottom having one end opened such that the pen 98 can be inserted, and the other end closed. The opened end of the pen cap 132 is provided with a flange part 132a projected outward in a radial direction.

Moreover, the cap receiving member 134 is a tube-shaped body in which the pen cap 132 can be inserted. The cap receiving member 134 is secured to a plate body 140 provided so as to rise upward from the side of the pen holder 90. Through this, the cap receiving member 134 is secured at a position that is roughly directly above the pen holder 90 and separated only by a predetermined distance.

The cap receiving member 134 has a hole 134a at a roughly center part at one end thereof (the lower end side in the figure), the hole 134a having an opening diameter which enables insertion of the pen 98. Moreover, the other end side of the cap receiving member 134 (the top end side in the figure) is open. The pen cap 132 is inserted with the flange part 132a facing downward into the inside of the cap receiving member 134. In this manner, the hole 134a of the cap receiving member 134 is in a state of communicating with the opening of the pen cap 132, and the rear end of the pen 98 can be inserted via the hole 134a.

The top plate 136 is attached such that it covers the top surface side of the cap receiving member 134. The top plate 136 is provided with an opening 136a. The opening diameter of the opening 136a is equal to or greater than the outer diameter of the above-described tube-shaped portion that forms the pen cap 132, and is smaller than the outer diameter of the flange part 132a. The top plate 136 is positioned such that the tube-shaped portion of the pen cap 132 can pass through the opening 136a, and is secured to the plate body 140.

The spring 138 is mounted so as to enclose an outer circumference of the tube-shaped portion that forms the pen cap 132, and the spring 138 is present between the top plate 136 and the flange part 132a of the pen cap 132. Therefore, the pen cap 132 is biased downward by the biasing force of the spring 138.

The pen holding mechanism 130 is configured as described above, and the rear end of the pen 98 is mounted thereto. In other words, the rear end of the pen 98 mounted to the pen holder 90 is inserted into the pen cap 132 via the hole 134a of the cap receiving member 134. Therefore, the pen 98 is in a state of being biased downward by the biasing force of the spring 138. Accordingly, as shown in FIG. 14A, when the tip end of the pen 98 is inserted into the pen tip insertion part 100, the tip end of the pen 98 is in a state of being firmly pressed within the pen tip insertion part 100, and the pen 98 can be protected against drying.

On the other hand, when a stamp is affixed to a packaging bag p by the pen 98, as shown by the arrow F in FIG. 14B, the plotter 56 descends from above towards the packaging bag p, and a pressing force is acted on the packaging bag p from the pen 98. In conjunction, as shown by the arrow R in FIG. 14B, a reaction force from the packaging bag p side acts on the pen 98 side. When the reaction force acts on the pen 98, the pen cap 132 and the pen 98 slide upward against the biasing force of the spring 138, and the spring 138 is compressed. By providing a pen holding mechanism 130 in this manner, the pen 98 moves upward in accordance with the pressing force applied from the pen 98 to the packaging bag p side, and crushing of the tip end of the pen 98 (pen tip) through its continued use can be prevented.

Modified Example of a Conveyance Device

As described above, with the medicine inspection system 10, the inspection device 20 is provided with a conveyance device 24. In order to improve the inspection accuracy of the inspection device 20, the packaging bag p (packaging bag continuous body P) is preferably conveyed roughly straight ahead. Moreover, in order to enable conveyance of the packaging bag p (packaging bag continuous body P) in a roughly straight manner, the width of the conveyance path configured with the conveyance device 24 is preferably prepared tailored to the width of the packaging bag p (packaging bag continuous body P).

Here, when the width of the packaging bag p (packaging bag continuous body P) is assumed to be constant in every case, the conveyance path width may be fixed as with the above-described conveyance device 24. However, if the width of packaging bag p (packaging bag continuous body P) that is supplied as the inspection target varies depending on the case, the width of the conveyance path is preferably configured so as to be variable in accordance with the width of the packaging bag p (packaging bag continuous body P) that is supplied. In other words, a conveyance device for which the width of the conveyance area provided is adjustable for conveying the packaging bag continuous body p is preferably adopted in place of the above-described conveyance device 24.

Figure 15:
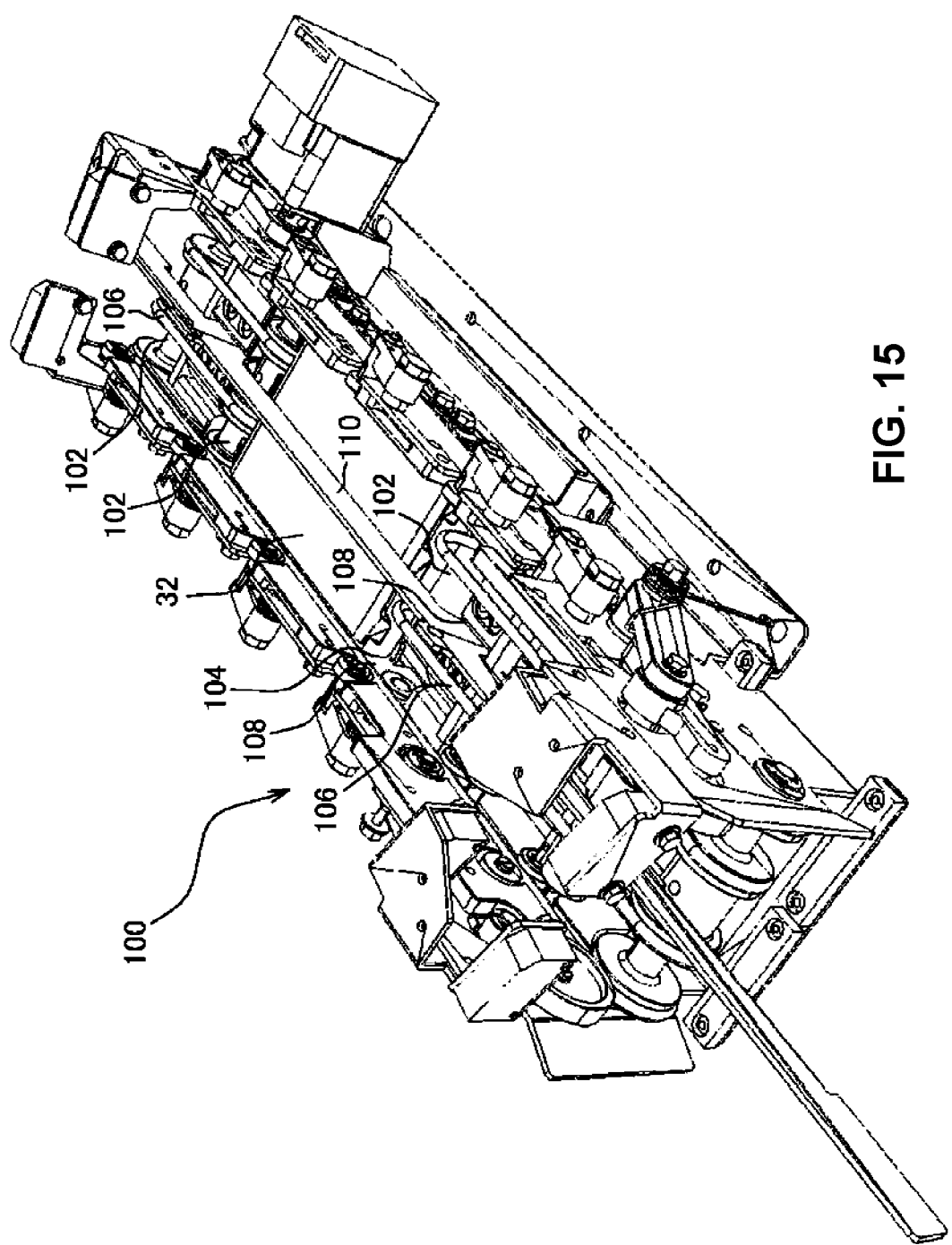
FIG. 15 is a perspective view showing a conveyance device.
Figure 16A:
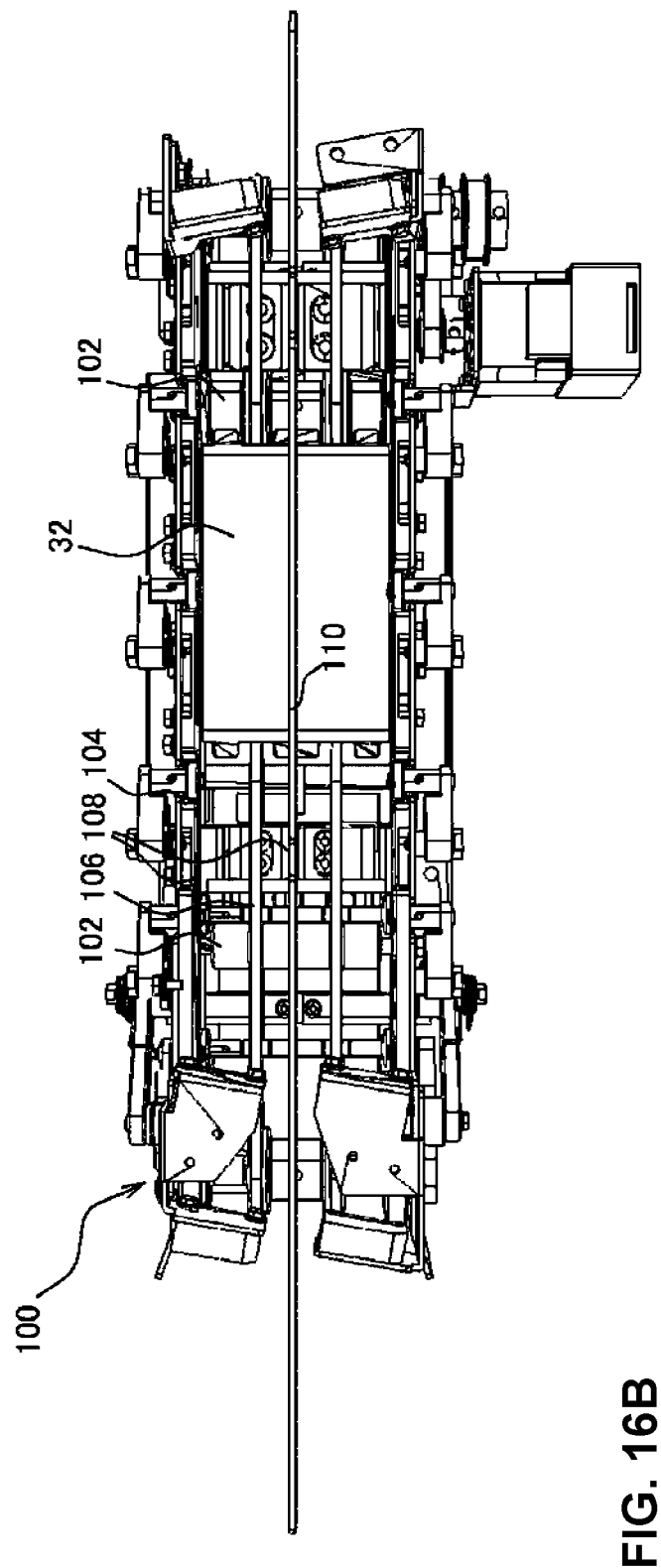
FIG. 16A is a plan view of the conveyance device shown in FIG. 15.

In order to make the width of the conveyance path variable as described above, for example, a conveyance device 100 like that shown in FIG. 15 and FIG. 16A can be adopted in place of the conveyance device 24. The configuration of the conveyance device 100 is explained in detail below. The conveyance device 100 is a conveyor configured with a plurality of rollers 102 arranged roughly in parallel and attached to a frame 104. Of the plurality of rollers 102 that are provided, some are capable of rotating by receiving power from a motor (not illustrated). Moreover, a belt 106 is suspended over a span between adjacent rollers 102 and 102. Therefore, when the roller 102 connected to the motor rotates, the other roller 102 also rotates in a coupled manner. Furthermore, a plurality of insertion grooves 108 are provided in the frame 104 in a direction intersecting the conveyance direction (roughly orthogonal in the present embodiment), or in other words, in the width direction. The height of the conveyance path (conveyance surface) configured by the conveyance device 100 is roughly the same as the surface of the inspection unit 32.

Figure 16B:
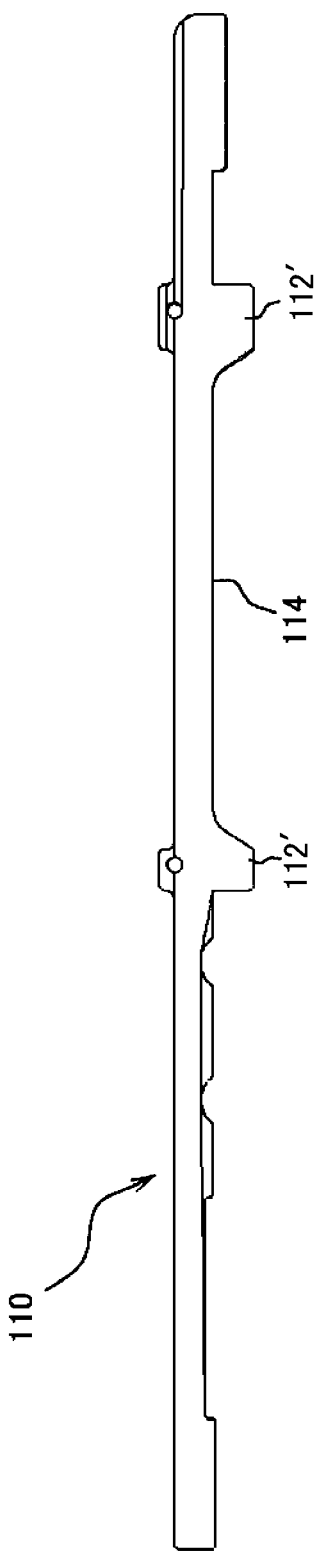
FIG. 16B is a front elevation view showing a conveyance width adjusting member.

In addition to the above-described conveyor configuration, a characteristic of the conveyance device 100 is that it is provided with a conveyance width adjusting member 110 as shown in FIG. 16B. More specifically, the conveyance device 100 is capable of adjusting the width of the conveyance area provided for conveying the packaging bag continuous body P by appropriately moving and positioning the conveyance width adjusting member 110 in a direction intersecting the conveyance direction (namely, in the width direction). The conveyance width adjusting member 110 is a member formed by a metal plate or other plate body. As shown in FIG. 15, the conveyance width adjusting member 110 is used in a state of standing upright roughly vertically.

The conveyance width adjusting member 110 has an insertion part 112' at a portion that becomes the bottom side in a usage state. The insertion part 112' projects so as to be capable of being inserted in the insertion groove 108 provided in the frame 104. Furthermore, a notch 114 is provided at a position corresponding to a center part in the longitudinal direction, or in other words, to the inspection unit 32 at a bottom side of the conveyance width adjusting member 110. Through this, by inserting the insertion part 112' into the insertion grooves 108 present at the center part of the frame 104 in the width direction, the conveyance width adjusting member 110 can avoid interference with the inspection unit 32, and the conveyance path (conveyance surface) can be divided into a conveyance region provided for conveying the packaging bag continuous body P at the middle portion in the width direction (the region further downward than the conveyance width adjusting member 110 in FIG. 16A) and a region not provided for conveyance (the region further upward than the conveyance width adjusting member 110 in FIG. 16A). Moreover, by inserting the insertion part 112' into the insertion grooves 108 provided in the vicinity of the side surface of the frame 104 to set the conveyance width adjusting member 110, roughly the entire conveyance path (conveyance surface) can be used as a conveyance area provided for conveyance of the packaging bag continuous body P.

By using a conveyance device 100 like that described above in place of the conveyance device 24 in the medicine inspection system 10, the width of the conveyance path can be tailored and adjusted to the width of the packaging bag p (packaging bag continuous body P). Through this, the packaging bag p (packaging bag continuous body P) can be conveyed in a roughly straight manner, thereby contributing to an improvement in the inspection accuracy of the inspection device 20, The configuration for switching the width of the conveyance path that uses the conveyance width adjusting member 110 adopted with the above-described conveyance device 100 can be modified as appropriate within a scope that does not exceed what is shown by the embodiment of the present invention or depart from the gist of the present invention. More specifically, although the above-described conveyance device 100 positions and secures the conveyance width adjusting member 110 by inserting and removing the insertion part 112' in the insertion grooves 108, the present invention is not limited thereto, and a configuration may be adopted in which a position adjusting mechanism or the like is provided to adjust the position of the conveyance width adjusting member 110.

Determining When Bags Have Run Out

The bag run out determination processing is processing that is implemented to determine the presence or absence of a packaging bag in the inspection unit 32. More specifically, bag run out determination processing is used to detect whether or not a packaging bag to be inspected has arrived at the inspection unit 32. Moreover, if there is a possibility that a packaging bag continuous body formed so as to be continuous is supplied as the packaging bag continuous body P via an empty package for which a packaging bag with a different prescription is provided midway, the bag run out determination processing is also used to discern whether it is OK or not to complete the inspection. With the medicine inspection system 10 of the present embodiment, bag run out determination is performed with a different method depending on whether a conveyance width adjusting member 110 is installed or not. The respective cases are described below.

Figure 20A:
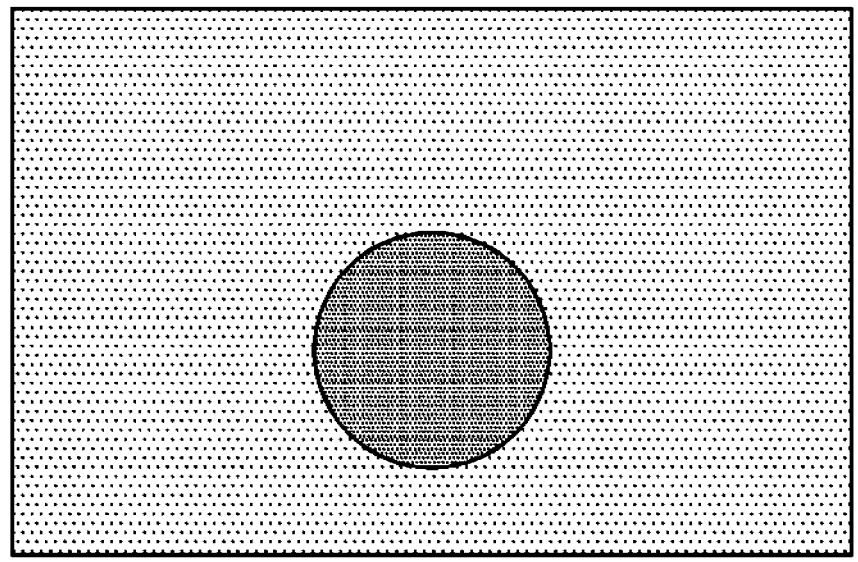
FIGS. 20A and FIG. 20B are the drawing conceptually showing one example of an image obtained by a photographing device during bag run out determination processing for a case in which a conveyance width adjusting member is not installed.

Bag Run Out Determination Processing When a Conveyance Width Adjusting Member 110 is Not Installed When a conveyance width adjusting member 110 is not installed, bag run out determination processing can be implemented by determining whether a packaging bag has arrived at the inspection unit 32 or not using information on whether or not the photographing device 40 itself is captured in the photographed image of the inspection unit 32 by the photographing device 40 as a reference. More specifically, if a packaging bag has not arrived on the stand of the inspection unit 32, as shown in FIG. 20A, an image is obtained in which the region corresponding to the inspection unit 32 (region a corresponding to the inspection unit) is photographed as a roughly deep black region. In a region of this image corresponding to directly underneath the photographing device 40, an image of the photographing device 40 itself is photographed as a notably darker region (photographing device image region 13) than the surrounding area. Therefore, a control device 60 determines that a packaging bag has not arrived at the inspection unit 32 when the presence of a photographing device image region·is confirmed in the region a corresponding to the inspection unit.

Figure 20B:
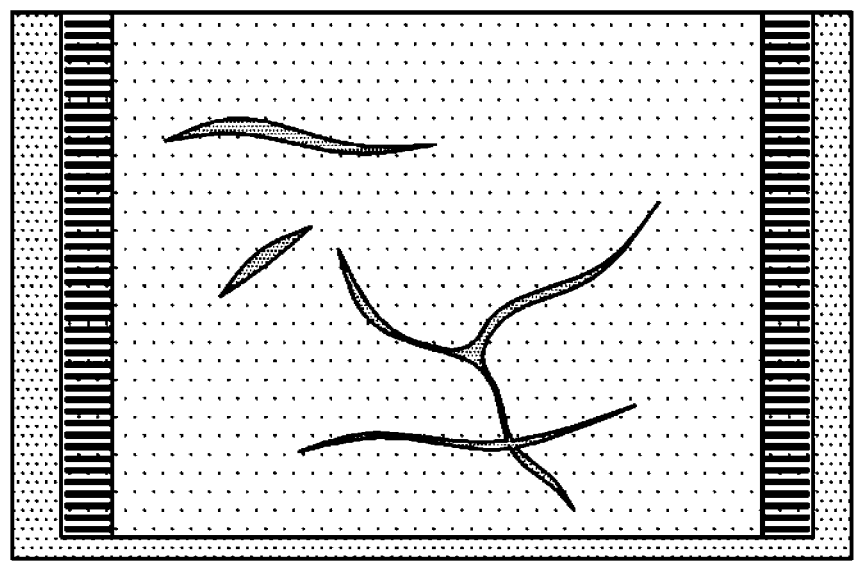

On the other hand, if a packaging bag has arrived on the stand of the inspection unit 32, as shown in FIG. 20B, an image of the packaging bag (packaging bag image γ) is captured, and the photographing device image region β cannot be seen. Therefore, the control device 60 determines that a packaging bag has arrived at the inspection unit 32 upon the condition that the presence of a photographing device image region β cannot be confirmed.

As described above, the photographing device 40 provided for image inspection can be effectively utilized to also determine the arrival of a packaging bag by determining whether a packaging bag has arrived or not using the presence or absence of a photographing device image region·in an image obtained by the photographing device 40 as a reference. Through this, the need to provide the likes of a separate sensor is eliminated, and the configuration the configuration of the device can be further simplified.

Figure 21:
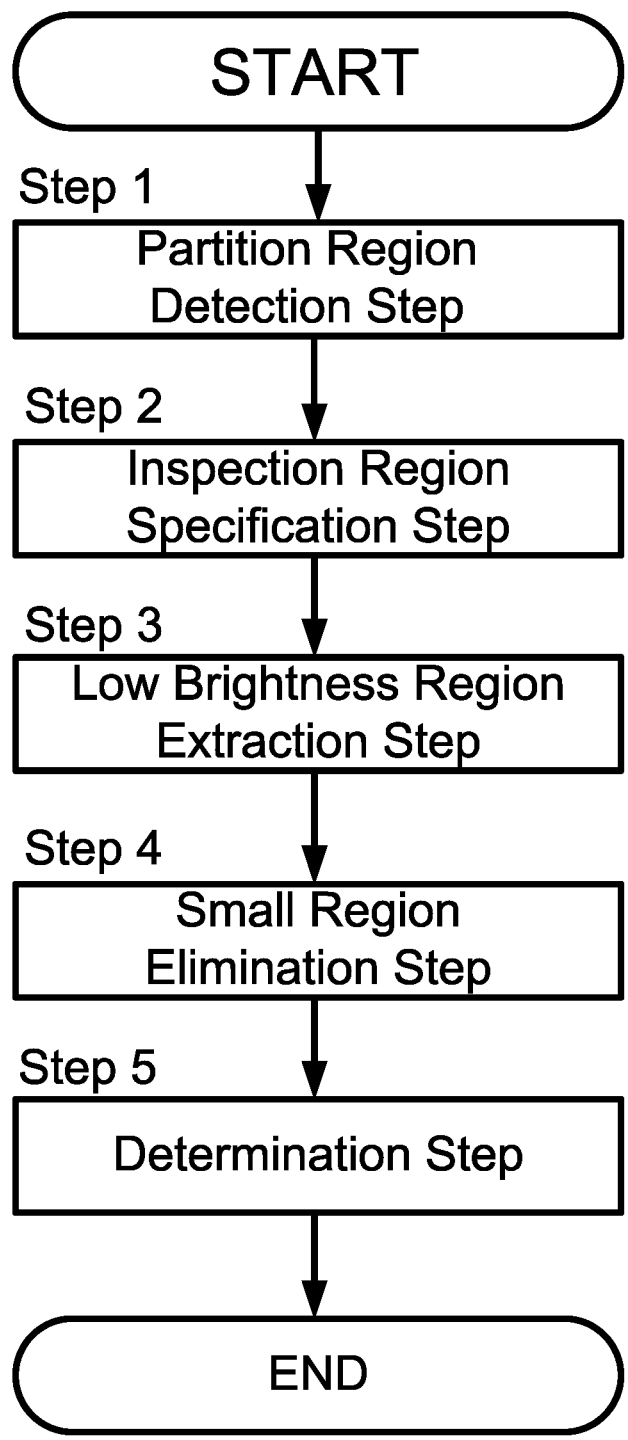
FIG. 21 is a flowchart pertaining to bag run out determination processing for a case in which a conveyance width adjusting member is installed.
Figure 22A:
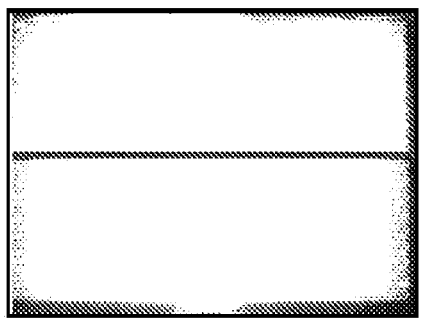
FIGS. 22A to 22E are image diagrams showing images acquired at each step in the flowchart shown in FIG. 21.

Bag Run Out Determination Processing When a Conveyance Width Adjusting Member 110 is Installed Next, bag run out determination processing for a case when a conveyance width adjusting member 110 is installed is described. If a conveyance width adjusting member 110 is installed, bag run out determination is implemented in accordance with a flow chart as shown in FIG. 21. Namely, first, in the partition region detection step of Step 1 image processing is performed to detect an installation region of the conveyance width adjusting member 110 from a backlight image (back surface side verification image) (see FIG. 22A). Here, backlight image refers to an image obtained through photographing using the photographing device 26 with the illumination device 28 in an OFF state and the back side illumination device 29 in an ON state as described above. Moreover, in the present embodiment, a device that emits a red light is used as the back side illumination device 29. Therefore, in the present embodiment, after the backlight image is subjected to RGB decomposition, the low brightness region of the R-channel is extracted. Next, areas other than the region that continues from the far left to the far right is removed by implementing opening processing. Through this, the installation region of the conveyance width adjusting member 110 can be detected from the backlight image.

Figure 22B:
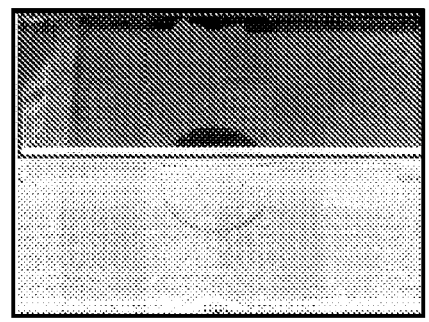

Next, in the inspection region specification step of Step 2, each of the regions divided by the conveyance width adjusting member 110 is confirmed if it is the region (inspection region) to which the packaging bag continuous body to be inspected is supplied (see FIG. 22B). With the medicine inspection system 10 of the present embodiment, a user can select and register in advance which region to use as the inspection region. Therefore, Step 2 confirms which of the upper or lower regions with respect to the conveyance width adjusting member 110 is selected as the inspection region. In the example of FIG. 22B, the information region of the conveyance width adjusting member 110 is selected as the inspection region.

Figure 22C:
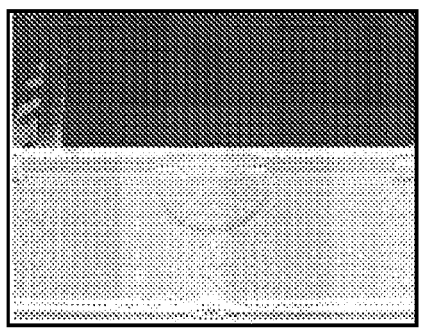

When confirmation of the inspection region has been completed in Step 2, a region contained in the front side illuminated image with lower brightness than a predetermined brightness level is derived in the low brightness region extraction step of Step 3. Here, as described above, the front side illuminated image is an image photographed and obtained by the photographing device 26 with the illumination device 28 in an ON state. In the present embodiment, the front side illuminated image is converted to obtain a channel image pertaining to brightness, and the low brightness region contained in this channel image is derived. As the method to obtain the brightness related channel image, the likes of a Lab conversion method, or a HSV conversion method, can be adopted. In the present embodiment, a front side illuminated image is Lab converted to obtain an L-channel image (brightness related channel image), and a region having a brightness lower than a brightness threshold stipulated in advance is extracted from this L-channel image. In the present embodiment, the charcoal colored region present further upward than the position corresponding to the conveyance width adjusting member 110 in the image shown in FIG. 22C is derived as the low brightness region.

Figure 22D:
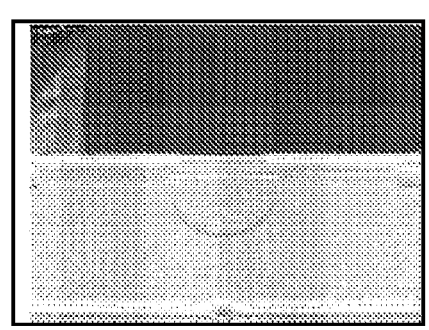

When extraction of the low brightness region is completed in Step 3, a low brightness region that is larger than a predetermined size is derived in the small region elimination step of Step 4. This step focuses on the fact that the size of the low brightness region attributable to a black or dark colored medicine is smaller than the size of the low brightness region attributable to the presence of a packaging bag, and is a step to prevent the erroneous extraction of the low brightness region attributable to the medicine. In this step, a low brightness region larger than a predetermined surface area is extracted through opening processing. With the present embodiment, the charcoal colored region present further upward than the position corresponding to the conveyance width adjusting member 110 in the image shown in FIG. 22D is extracted as the large region with low brightness. Note that the size in the height direction for opening processing is determined using the height of the inspection region derived in the abovementioned Step 2 as a reference. Moreover, the threshold pertaining to the size of the region in this step can be determined using the size assumed as the low brightness region attributable to the medicine as a reference.

Figure 22E:
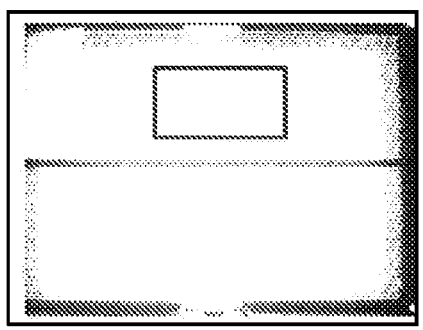

When a low brightness region larger than a predetermined size is derived in Step 4, the next Step 5, which is a determination step, confirms whether a region having a lower brightness than a predetermined brightness level is present or not near the center of an inspection region (confirmation region) from the R-channel image of the backlight image. The confirmation region is a region in roughly the center part in the width direction of the inspection region and is set to a size corresponding to approximately 60% of the region width. The width of the confirmation region can be appropriately set, but is preferably adjusted such that the occurrence of erroneous determinations due to the photographing of the end of the packaging bag or the like at a position separated from the inspection unit 32 can be prevented. In the present embodiment, the region enclosed by a rectangle in FIG. 22E is selected as the confirmation region.

If a packaging bag is present in the confirmation region, the brightness of the confirmation region in the backlight image is lower than when a packaging bag is not present only by the amount for which light is blocked by the back side illumination device 29 because of the packaging bag. Therefore, in Step 5, the presence or absence of a packaging bag, or in other words, a state in which the bags have run out or not can be confirmed by whether the brightness of the confirmation region in the backlight image is high or not with respect to a reference brightness that was established in advance as a reference for a case in which a packaging bag is present. In other words, if the brightness of the confirmation region is brighter than the reference brightness, then a shortage in bags has occurred, and if the brightness thereof is at or below the reference brightness, it is determined that a packaging bag is present at the inspection unit 32.

According to the method described above for determining if bags have run out, even if a conveyance width adjusting member 110 is installed, the presence or absence of a packaging bag at the inspection unit 32 can be correctly determined. Moreover, by adopting the above-described method for determining the shortage of bags, there is no need to provide the likes of a separate sensor, wherein the likes of a photographing device 26 used for inspection can be effectively utilized to determine if the bags have run out. Through this, the device configuration can be simplified, and manufacturing costs can be suppressed.

Note that with the present embodiment, an example was shown in which the small region elimination step of Step 4 was provided in order to improve the extraction accuracy of the low brightness region implemented by the low brightness region extraction step of Step 3, but the present invention is not limited thereto. Namely, the small region elimination step of Step 4 may be omitted in such a case if the accuracy of extracting the low brightness region by the low brightness region extraction step of Step 3 is sufficient.

Boundary Selection Processing

Here, in order to further improve the inspection accuracy with the medicine inspection system 10, the packaging bag continuous body is preferably arranged such that the center of the packaging bag to be inspected arrives at the center of the inspection unit 32. Therefore, some sort of measure is favorably devised so that when the packaging bag to be inspected is moved to the inspection unit 32, the packaging bag can be arranged with good positioning accuracy with respect to the inspection unit 32. More specifically, for example, if a welded portion formed between adjacent packaging bags in the packaging bag continuous body, or perforations or another boundary d (see FIG. 26) is used as a marker, and the position of the packaging bag (packaging bag continuous body) is finely adjusted using the marker thereof as a reference, the positioning accuracy of the packaging bag with respect to the inspection unit 32 can be improved.

Figure 25A:
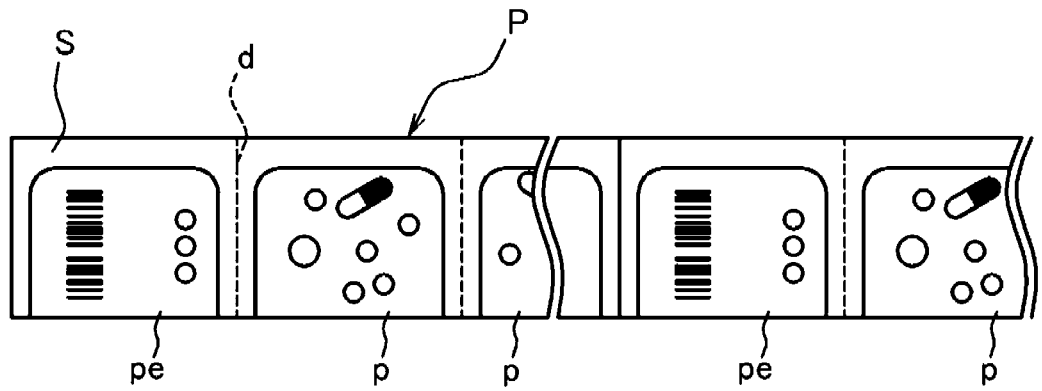
FIG. 25A is a front elevation view showing one example of a packaging bag continuous body.
Figure 25B:
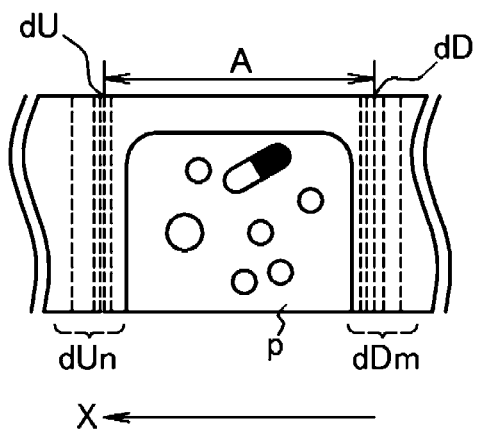
FIG. 25B is an explanatory diagram for explaining the boundary selection processing.

However, if image processing or the like is implemented using an image obtained by the photographing device 26, and an attempt is made to detect perforations or the like forming the boundary d, in some cases, a plurality of candidates for the boundary d may be derived (see FIG. 25B). In this case, the candidates for the boundary d can be narrowed down to a single candidate by improving the image processing accuracy. However, in this case, problems can occur such as a considerable load being applied to the control device 30 in order to implement the likes of image processing, or the processing time becoming too long. Accordingly, in the case of a plurality of candidates being derived for the boundary d, if processing to select an appropriate boundary d from these candidates can be easily executed, the positioning accuracy of the packaging bag with respect to the inspection unit 32 can be improved, whereby the load on the control device 30 can be reduced, and the processing speed can be improved.

Figure 26:
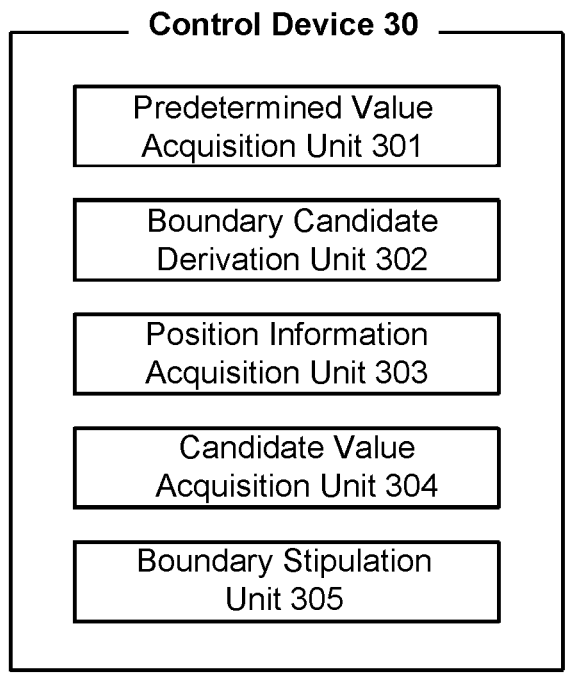
FIG. 26 is a block diagram showing one example of a control device capable of implementing boundary selection processing.
Figure 27:
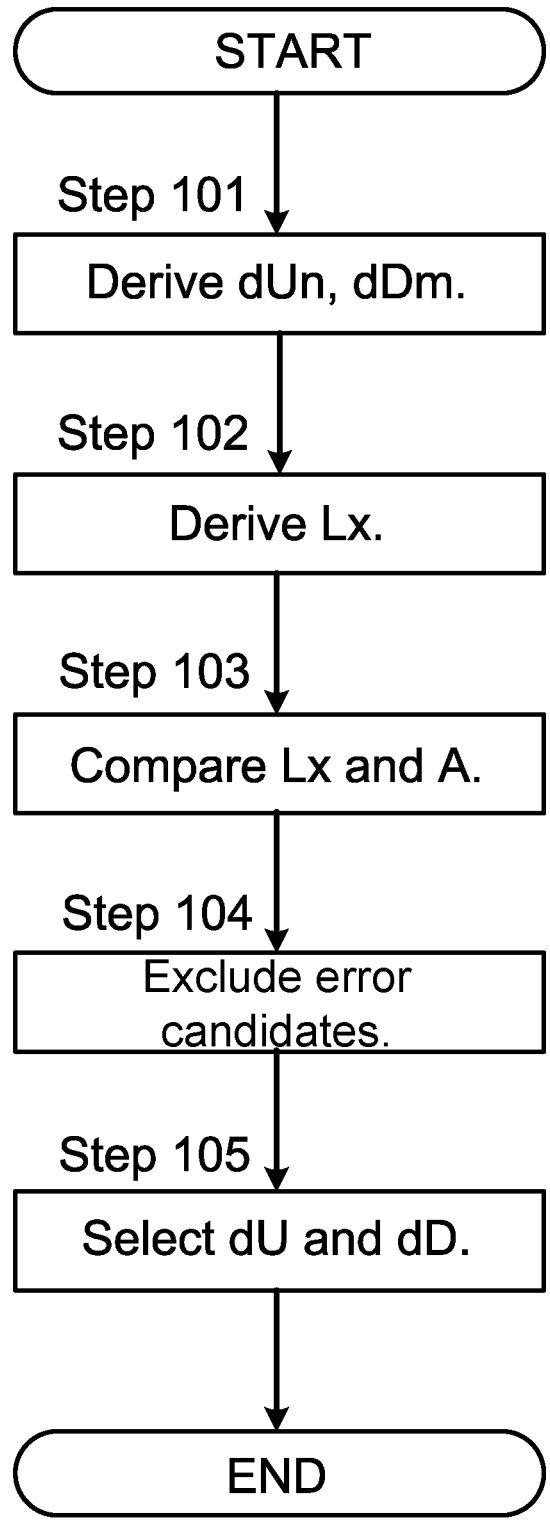
FIG. 27 is a flowchart showing the processing flow of boundary selection processing.

In order to resolve the abovementioned issues, the ability to execute boundary selection processing like that shown in FIG. 27 using the control device 30 is preferable. More specifically, as shown in FIG. 26, the control device 30 is provided with a predetermined value acquisition unit 301, a boundary candidate derivation unit 302, a position information acquisition unit 303, a candidate value acquisition unit 304, and a boundary stipulation unit 305. By executing various processing in accordance with a predetermined control program using the CPU, the control device 30 functions as the predetermined value acquisition unit 301, the boundary candidate derivation unit 302, the position information acquisition unit 303, the candidate value acquisition unit 304, and the boundary stipulation unit 305. When functioning as the predetermined value acquisition unit 301, the boundary candidate derivation unit 302, the position information acquisition unit 303, the candidate value acquisition unit 304, and the boundary stipulation unit 305, the control device 30 is an example of a predetermined value acquisition means, a boundary candidate derivation means, a position information acquisition means, a candidate value derivation means, and a boundary stipulation means.

The predetermined value acquisition unit 301 is used to acquire a predetermined value for a length of the packaging bag to be inspected. The predetermined value acquisition unit 301 can obtain data (bag length data) for the length of a packaging bag (packaging bag length A) for each packaging bag stipulated in advance from the control device of the medicine dividing and packaging device 200, an upper control device, or the like.

The boundary candidate derivation unit 302 is used to derive one or a plurality of boundaries assumed to be a boundary d between the packaging bag to be inspected and another adjacent packaging bag on the upstream side of the packaging bag thereof (hereinafter, also referred to as "upstream side boundary dU"), or a boundary d positioned on the downstream side thereof (hereinafter, also referred to as "downstream side boundary dD") (see FIG. 25B). By implementing image processing of an image photographed of the packaging bag continuous body, the boundary candidate derivation unit 302 derives the upstream side boundary candidate dUn (n is a positive integer of 1 or greater) and the downstream side boundary candidate dDm (where m is a positive integer of 1 or greater), which is the candidate for the downstream side boundary dD. Note that as the method for deriving the boundary d by the boundary candidate derivation unit 302, any type of method may be appropriately selected within a scope that does not depart from the gist of the present invention.

The position information acquisition unit 303 is used to acquire position information on all upstream side boundary candidates dUn and all downstream side boundary candidates dDm. More specifically, the position information acquisition unit 303 obtains position information in the movement direction (X-direction) of the packaging bag continuous body for the upstream side boundary candidates dUn and the downstream side boundary candidates dDm from image information photographed by the photographing device 26.

The candidate value acquisition unit 304 implements calculations based on position information obtained from the position information acquisition unit 303 for a combination of all upstream side boundary candidates dUn and downstream side boundary candidates dDm (dUn, dDm), and derives a candidate value for the length of the packaging bag to be inspected as an interval Lx (x is a combination number of (dUn, dDm)).

Of the intervals Lx derived by the candidate value acquisition unit 304, the boundary stipulation unit 305 selects the interval Lx that approaches a packaging bag length A, which is a predetermined value for the length of the packaging bag to be inspected. The boundary stipulation unit 305 also stipulates a combination of the upstream side boundary candidate dUn and the downstream side boundary candidate dDm configuring the selected interval Lx (dUn, dDm) as the upstream side boundary dU and the downstream side boundary dD positioned at the upstream side and downstream side of the packaging bag to be inspected.

The boundary selection processing through the above-described control device 30 is executed in accordance with the control flow shown in FIG. 27. Namely, first, the upstream side boundary candidates dUn (n is a positive integer of 1 or greater) and the downstream side boundary candidates dDm (m is a positive integer of 1 or greater) are derived in Step 101 for a packaging bag to be inspected by implementing image processing of an image acquired by the photographing device 26.

Next, in Step 102, the control device 30 derives a difference for all combinations of the upstream side boundary candidates dUn and the downstream side boundary candidates dDm (dUn, dDm), and this is derived as an interval Lx (x is a combination number of (dUn, dDm)).

In Step 103, the control device 30 compares the interval Lx derived in Step 102 with data for the packaging bag length A (bag length data) of each packaging bag acquired in advance from the control device of the medicine dividing and packaging device 200, an upper control device, or the like. Moreover, of the derived intervals Lx, in Step 104, the control device 30 excludes all combinations of (dUn, dDm) corresponding to those intervals Lx that are larger by a predetermined length or greater (for example, 5 mm) than the packaging bag length A stipulated in advance from the selected candidates as error candidates.

In Step 105, an upstream side boundary dU and a downstream side boundary dD are selected from the remaining (dUn, dDm) combinations that were not the target of exclusion in the abovementioned Step 104. More specifically, of the (dUn, dDm) combinations, the upstream side boundary candidate dUn and the downstream side boundary candidate dDm for which the smallest difference is formed between the interval Lx and the packaging bag length A are respectively selected as the upstream side boundary dU and the downstream side boundary dD.

By deriving the upstream side boundary dU and the downstream side boundary dD of the packaging bag to be inspected as described above, and using the boundaries thereof as references to position the packaging bag with respect to the inspection unit 32, the inspection accuracy of the medicine inspection system 10 can be further improved. Furthermore, by implementing as described above, even if packaging bags with different packaging bag lengths are mixed together, the positioning accuracy of the packaging bag with respect to the inspection unit 32 and the inspection accuracy can be improved. Note that the above-described boundary selection processing is not implemented for a packaging bag prepared with the packaging bag length A being unclear or not particularly stipulated as with the empty package pe.

Detecting the Next Prescription When Continuous Prescriptions are Present

Here, as with the above-described packaging bag continuous body, if the packaging bags are formed in a serial state, prescriptions being formed in a so-called continuous prescription state with a series of packaging bags containing different prescriptions being formed in a single packaging bag continuous body is assumed. In this manner, if packaging bags of different prescriptions are contained in a single packaging bag continuous body, as shown in FIG. 25A, an empty package pe is preferably provided midway in the packaging bag continuous body in order to demarcate packaging bags having different prescriptions. In other words, the provision of an empty package pe to demarcate prescriptions between a prescription that is first inspected and a prescription to be next inspected is preferred.

Moreover, in addition to a barcode or other type of identification information that denotes prescription details and the like of the next prescription, a stamp is preferably affixed to identify the start position of the next prescription on the empty package pe used to demarcate prescriptions.

More specifically, as shown in FIG. 25A, a specific mark (three round stamps in a row in the illustrated example) is affixed, and this mark may also be used as a reference to adjust the inspection position. In this manner, even a packaging bag continuous body of continuous prescriptions can be reliably demarcated and classified, and inspection accuracy can be further improved.

Winding and Feed Device

Figure 17:
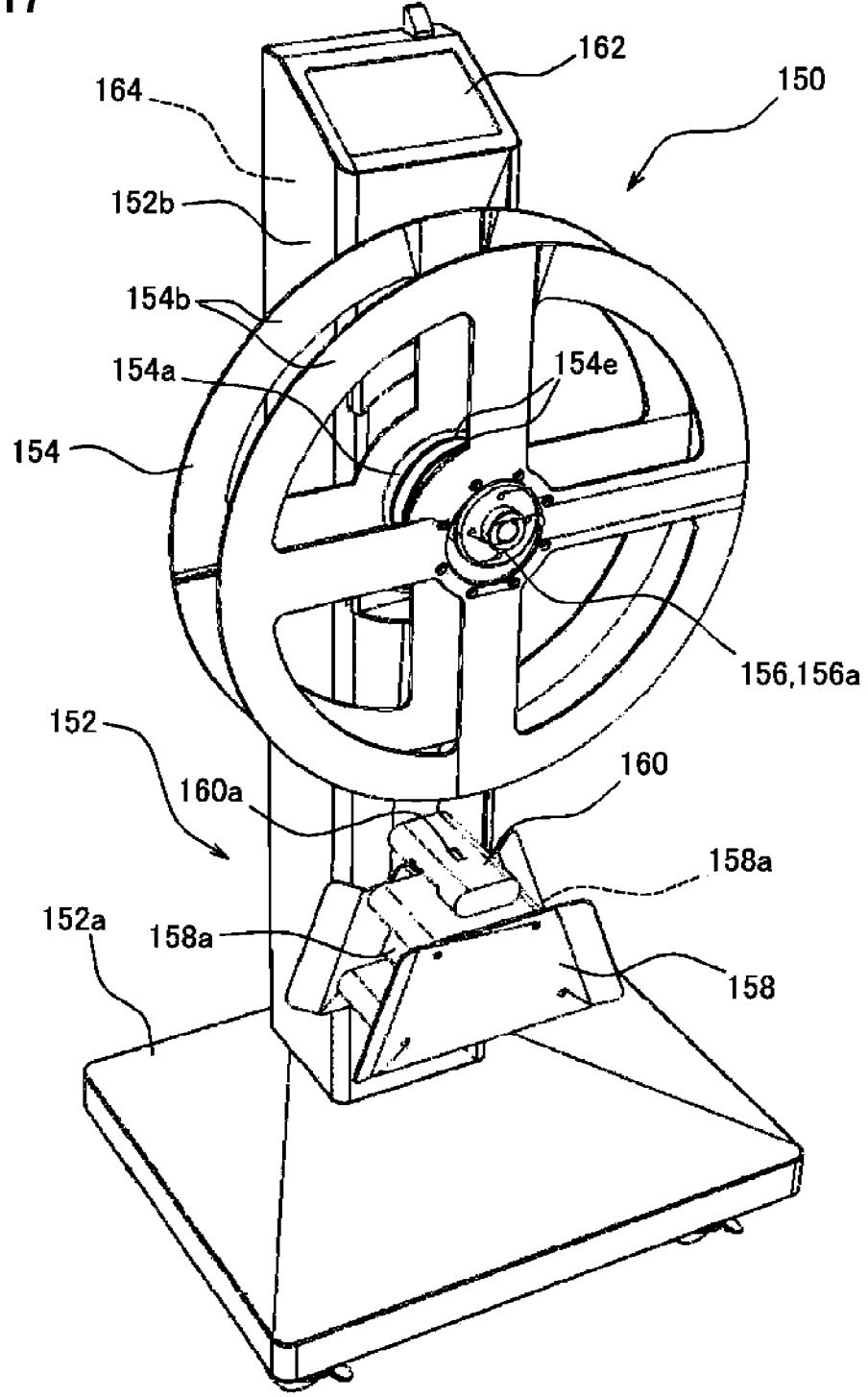
FIG. 17 is a perspective view showing a winding and feed device.

When handling a packaging bag continuous body P as in the above-described medicine inspection system 10, if the configuration is such that the packaging bag continuous body P is wound into a roll shape, and then as necessary, unreeled and inspected, it is assumed that the efficiency of this series of operations can be improved. Therefore, the medicine inspection system 10 is preferably equipped with a winding and feed device capable of winding and unreeling the packaging bag continuous body P. Moreover, because the packaging bag continuous body P is a body with continuous packaging bags in which a medicine is individually packaged, the winding and feed device is preferably a device that gently performs the winding operation and the unreeling operation such that an excessively large force is not acted on the packaging bag continuous body during winding or unreeling. As an example of a device that is based on this type of knowledge and can be favorably used with a medicine inspection system 10, a winding and feed device 150 shown in FIG. 17 and FIGS. 18A and 18B are explained below.

The winding and feed device 150 can be configured so as to be capable of both supplying the packaging bag continuous body P to the inspection device 20 and winding the packaging bag continuous body discharged from the inspection device 20. Moreover, the winding and feed device 150 can wind the packaging bag continuous body P discharged from the medicine dividing and packaging device 200, and can unreel the wound packaging bag continuous body P and supply it to the inspection device 20. In other words, the winding and feed device 150 is provided with both a function as a winding device which winds the packaging bag continuous body P, and a function as a feed device that unreels the packaging bag continuous body P.

The winding and feed device 150 is provided with a main body 152, a holder 154, an operating unit 156, a looseness detection device 158, a winding state detection device 160, an operating device 162, and a control device 164. The main body 152 has a support column 152*b* that rises roughly vertically upward from a base 152*a*, The holder 154 is a bobbin-shaped member capable of winding the packaging bag continuous body into a roll shape. In other words, the holder 154 is formed with a tube part 154*a* at a shaft center position, and circular shaped plates 154*b*, 154*b* attached to both ends of the tube part 154*a*. The holder 154 has the tube part 154*a* at the core, and is capable of winding the packaging bag continuous body P between the plates 154*b*, 154*b*.

Moreover, an antislip member 154*e* is mounted over roughly the entire circumference of the outer circumference of the tube part 154*a*. The antislip member 154*e* is a member to prevent the occurrence of the packaging bag continuous body P slipping on the surface of the tube part 154*a* and thereby causing winding problems when winding of the packaging bag continuous body P is first started on the tube part 154*a*. The antislip member 154*e* may be any type of member as long as it is capable of preventing slippage of the packaging bag continuous body P. With the present embodiment, two rubber O-rings are mounted as the antislip member 154*e*.

The operating unit 156 is provided to cause rotation of the holder in the forward direction and the reverse direction centering the shaft center position. The operating unit 156 has a rotating shaft 156*a* that rotates by the power of a motor built into the support column 152*b* forming the main body 152. The rotating shaft 156*a* projects in a roughly vertical direction with respect to the support column 152*b*, and by inserting the rotating shaft 156*a* into the tube part 154*a* of the holder 154, the holder 154 can be mounted to the operating unit 156.

Moreover, an antislip member 156*b* is mounted across roughly the entire outer circumference of the rotating shaft 156*a*. The antislip member 156*b* is used to suppress slippage of the tube part 154*a* of the holder 154 with respect to the rotating shaft 156*a*. The antislip member 156*b* may be any type of member as long as it is capable of preventing slippage of the holder 154, but in the present embodiment, two rubber O-rings are mounted to the rotating shaft 156*a* as the antislip member 156*b*.

The looseness detection device 158 is located further downward on the support column 152*b* than the rotating shaft 156*a*, and in a state with the holder 154 mounted to the operating unit 156, wherein the looseness detection device 158 is provided with sensors 158*a* arranged at positions arriving below the holder 154. The sensors 158*a* and 158*b* are respectively arranged so as to be oriented in right and left directions when viewing the holder 154 from the front surface. Through this, the packaging bag continuous body P can be detected regardless of whether it is wound with respect to the holder 154 in a clockwise rotation direction or a counterclockwise rotation direction.

The looseness detection device 158 is capable of outputting a detection signal in accordance with a distance from the packaging bag continuous body P being wound on the holder 154. More specifically, the looseness detection device 158 detects when it bends and approaches a distance from the packaging bag continuous body P that is at or below a predetermined winding instruction distance when winding the packaging bag continuous body P, and it is capable of transmitting a detection signal notifying of the gist thereof to the control device 164. Moreover, the looseness detection device 158 is also capable of detecting when it bends and approaches a distance from the packaging bag continuous body P that is at or below a predetermined unreeling instruction when unreeling the packaging bag continuous body P, and of transmitting a detection signal notifying of the gist thereof to the control device 164.

The winding state detection device 160 is provided with a sensor 160*a* disposed at a position separated in a winding radial direction of the packaging bag continuous body P with respect to the holder 154. With the present embodiment, the winding state detection device 160 is provided at a position that is further downward than the rotating shaft 156*a* on the support column 152*b*, but further upward than the looseness detection device 158. If a winding operation and an unreeling operation are performed for the packaging bag continuous body P, the packaging bag continuous body P passes through a space formed between the winding state detection device 160 and the looseness detection device 158. The sensor 160*a* is installed so as to be oriented toward the holder 154 side. The winding state detection device 160 is capable of outputting a detection signal in accordance with a distance from the packaging bag continuous body P wound on the holder 154. More specifically, if the distance to the packaging bag continuous body P becomes a distance that is at or below a predetermined winding upper limit distance, the winding state detection device 160 is capable of outputting a detection signal indicating the gist thereof to the control device 164.

The operating device 162 is provided in order to operate the winding and feed device 150. In the present embodiment, the operating device 162 is provided at the top end of the support column 152b. By operating the operating device 162, the user can choose to either wind or unreel the packaging bag continuous body P using the winding and feed device 150.

The control device 164 is capable of controlling the execution of the winding operation and the unreeling operation of the packaging bag continuous body P with respect to the holder 154 by outputting an operation command to the operating unit 156 based on a detection signal or the like output from the looseness detection device 158 and the winding state detection device 160. As shown in FIG. 17, the control device 164 is built into the main body 152. The control device 164 outputs an operation command to the operating unit 156 so that the rotating shaft 156a is caused to rotate in the direction at which the winding operation of the packaging bag continuous body P is advancing conditional upon the output of a detection signal which indicates that a state has been reached at which the distance between the packaging bag continuous body P and the looseness detection device 158 has approached a distance that is at or below a predetermined winding instruction distance when the packaging bag continuous body P is being wound onto the holder 154.

Moreover, if an operation of unreeling the packaging bag continuous body P wound onto the holder 154 is executed, the control device 164 controls the rotation of the rotating shaft 156a such that the unreeling operation of the packaging bag continuous body P is either stopped or the speed thereof is reduced conditional upon an output from the looseness detection device of a detection signal which indicates that a state has been reached at which the distance between the packaging bag continuous body P and the looseness detection device 158 has approached a distance that is at or below an unreeling instruction distance.

The control device 164 also causes the rotation of the rotating shaft 156a to stop and the winding operation to end conditional upon a receipt from the winding state detection device 160 of a detection signal which indicates that the distance to the packaging bag continuous body P is at or below the winding upper limit distance.

As described above, the winding and feed device 150 implements operations to cause the winding operation of the packaging bag continuous body to advance in a state in which the packaging bag continuous body P is hanging down by a certain amount from the holder 154. In other words, the winding operation of the packaging paper continuous body P can be implemented in a state in which an excessively large force is not acted on the packaging paper continuous body P, and an overly loose condition is not excessively created. Therefore, according to the winding and feed device 150, the operation of winding the packaging bag continuous body P onto the holder 154 can be smoothly implemented without an excessively large tension or other force being acted on the packaging bag continuous body P. Moreover, the winding and feed device 150 can reliably detect when the packaging bag continuous body P has reached the upper limit amount for the ability to wind onto the holder 154 based on the detection signal of the winding state detection device 160, and can cause the winding operation to stop at the appropriate timing.

In addition, when a packaging bag continuous body P that has been wound onto the holder 154 is unreeled, and the unreeling speed is fast such that the packaging bag continuous body P reaches a state in which it is hanging down from the holder 154, the winding and feed device 150 can either stop the unreeling operation of the packaging bag continuous body, or reduce the unreeling speed thereof. Therefore, according to the winding and feed device 150, the unreeling speed of the packaging bag continuous body P can also be optimized.

With the winding and feed device 150 of the present embodiment, an example was presented in which an antislip member 154e including an O-ring was provided at the outer circumference of the tube part 154a, but the present invention is not limited thereto, and a configuration in which an antislip member 154e is not provided may also be adopted. Furthermore, in addition to the antislip member 154e, or in place of the antislip member 154e, a member that makes it easier to wind the packaging bag continuous body P with respect to the tube part 154a, and also enables natural separation of the packaging bag continuous body P from the holder 154 when unreeling may also be provided at the holder 154.

Figure 19A:
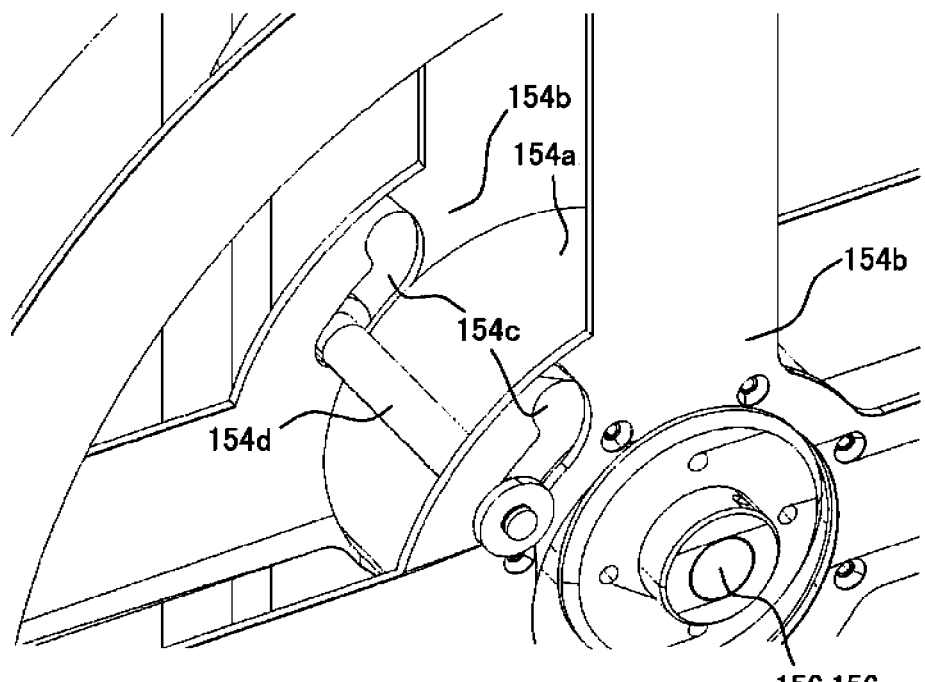
FIGS. 19A and FIG. 19B are the enlarged perspective of key parts of a winding and feed device according to a modified example.
Figure 19B:
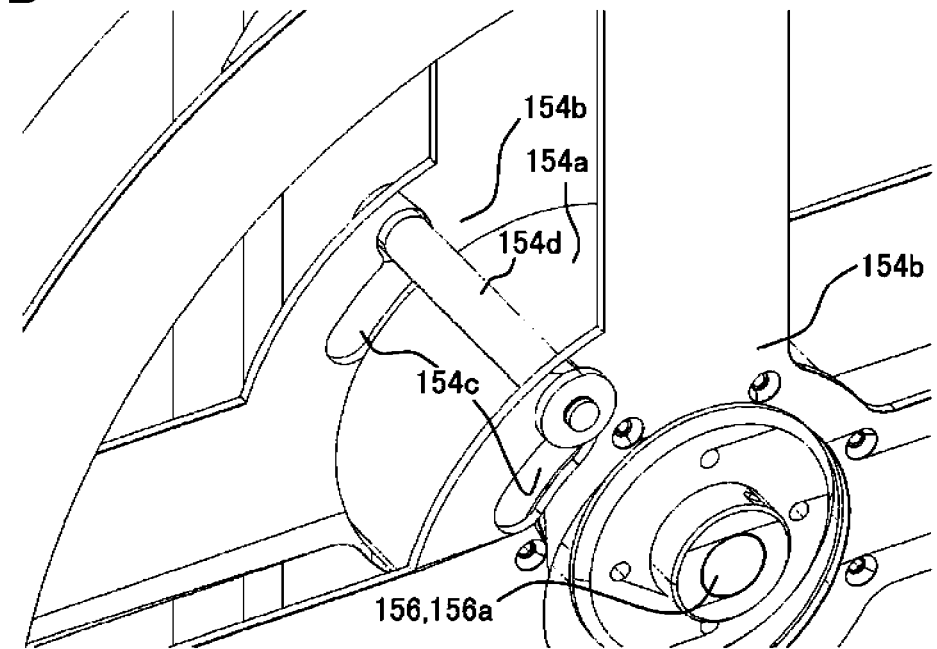

More specifically, as shown in FIGS. 19A and 19B, guide grooves 154c, 154c are provided in the plates 154b, 154b provided at both ends of the tube part 154a, and a pin 154d inserted across the span between the guide grooves 154c, 154c is also provided. The guide grooves 154c, 154c are formed so as to extend along the outer circumference of the tube part 154a near the tube part 154a, Moreover, as shown in FIG. 19A, the guide grooves 154c, 154c are formed such that by sliding the pin 154d to one side in the circumferential direction along the guide grooves 154c, 154c, the clearance between the outer circumferential surface of the tube part 154a and the pin 154d becomes smaller, and as shown in FIG. 19B, by sliding the pin 154d in the opposite direction, the clearance becomes larger. Through this, in the initial stage of winding the packaging bag continuous body P onto the holder 154, the packaging bag continuous body P can be secured so that it does not slide by inserting the end of the packaging bag continuous body P between the pin 154d and the tube part 154a, and next, sliding the pin 154d in the direction that makes the clearance thereof smaller. Moreover, in the final stage of unreeling the packaging bag continuous body P from the holder 154, the tension acting on the packaging bag continuous body P causes the pin 154d to operate in a direction that expands the clearance, and as a result, the unreeling operation of the packaging bag continuous body P can be completed without manually sliding the pin 154d. In other words, when a configuration is such that the final end of the packaging bag continuous body P remains secured to the holder 154 if the pin 154d is not operated, if an operation to release the securement by the pin 154d is not performed at the proper timing when feeding the packaging bag continuous body P from the winding and feed device 150 to the inspection device 20, a large load could be applied to the packaging bag continuous body P, and this could result in the likes of damage. However, by adopting a configuration in which the force acting in association with the unreeling of the packaging bag continuous body P is used to cause the pin 154d to naturally slide in a direction of releasing the secured state, the securement of the final end of the packaging bag continuous body P can be naturally released from the holder 154 at the appropriate timing when unreeling the packaging bag continuous body P while constantly maintaining an optimum amount of tension. Through this, the unreeling operation of the packaging bag continuous body P can be completed without manually sliding the pin 154d.

Figure 23:
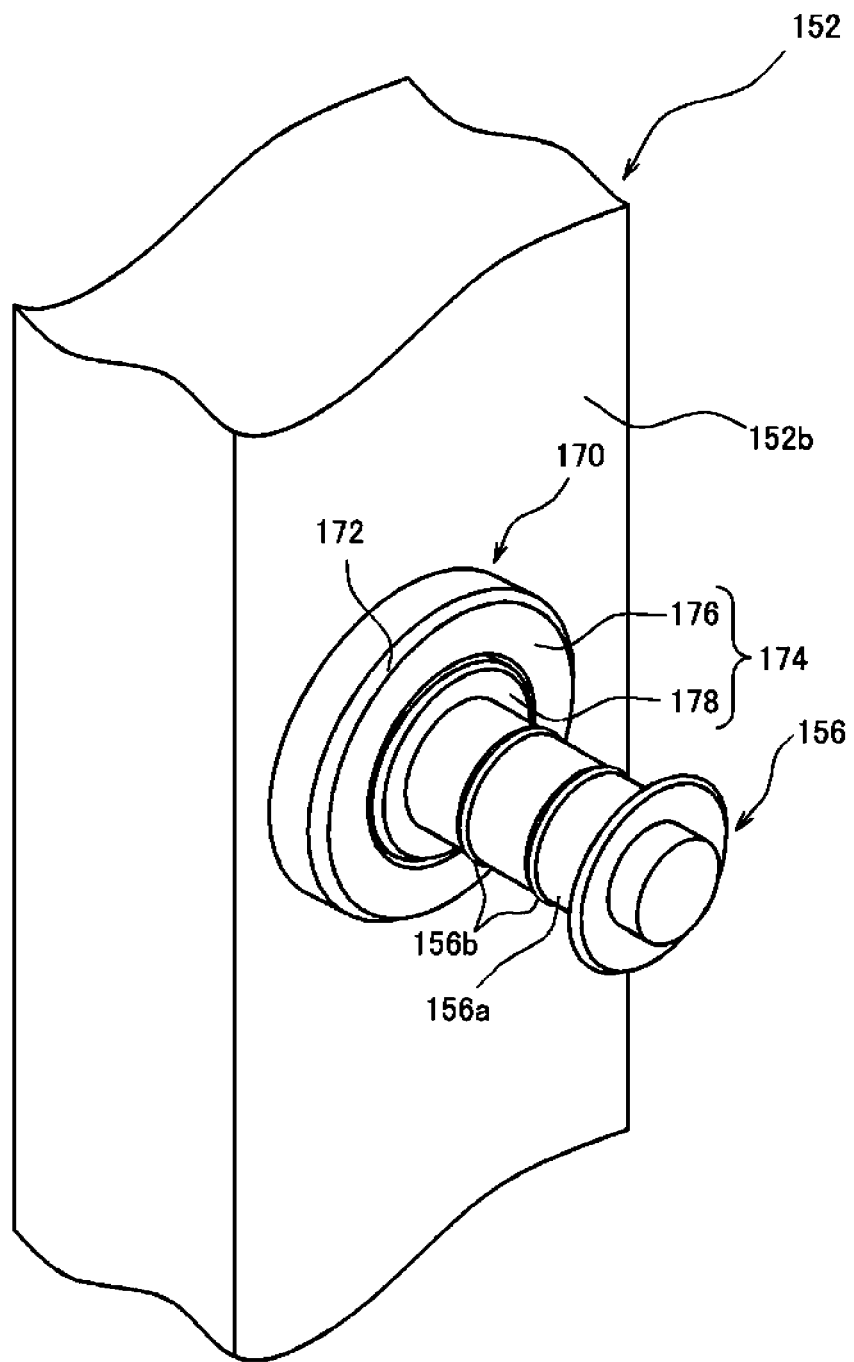
FIG. 23 is a perspective view showing key parts of a modified example of a winding and feed device.
Figure 24:
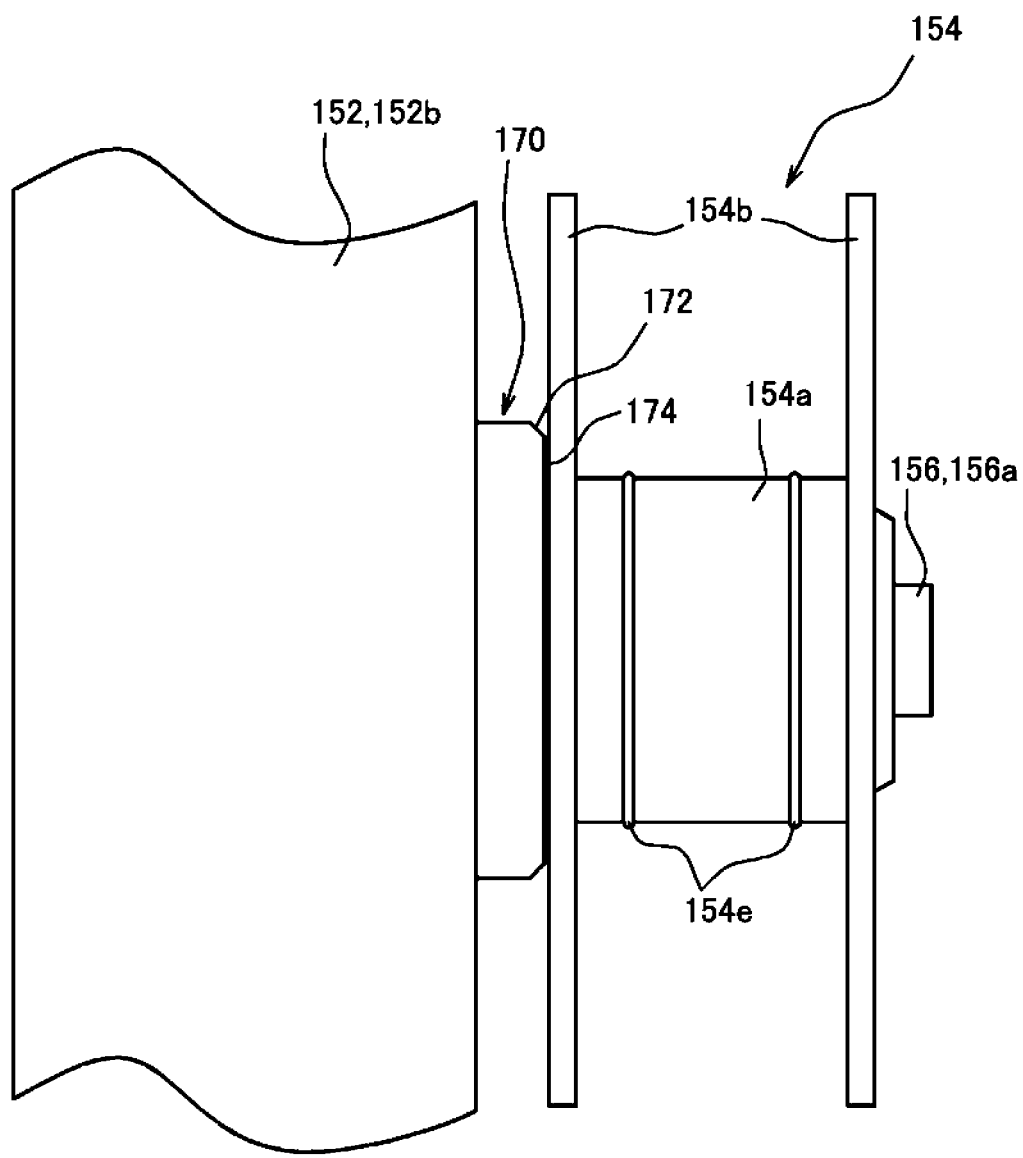
FIG. 24 is a side view showing key parts of a modified example of a winding and feed device.

With the winding and feed device 150 described in the above embodiment, an example was presented in which an arc-shaped abutment body material was provided at a surface abutted by the holder 154 at the support column 152b as shown in FIGS. 18A and 18B, but the present invention is not limited thereto. More specifically, in order to further facilitate the attachment of the holder 154 and to make the rotation even smoother, a configuration provided with an abutment body 170 as shown in FIG. 23 at the base end of the rotating shaft 156a may be adopted.

When described in greater detail, the abutment body 170 has a circular form when viewed from the front surface, but has a tapered part 172 provided by the likes of chamfering, and is formed so as to become a tapered shape toward the tip end direction of the rotating shaft 156a. In this manner, when temporarily mounting the holder 154, even if the holder 154 if inserted to a position that catches on the abutment body 170, the holder 154 slides along the incline of the tapered part 172 due to the influence of the weight and the like of the holder 154 itself, and a state in which the holder 154 is reliably mounted to the rotating shaft 156a is achieved.

Moreover, an outer circumference part 176 and an inner circumference part 178 are provided in a concentric shape at a surface 174 of the abutment body 170, namely, the surface of the holder 154 facing the plate 154b. The inner circumference part 178 is positioned at an inner circumference side (shaft center side of the rotating shaft 156a) with respect to the outer circumference part 176, and projects further to the tip end side of the rotating shaft 156a than the outer circumference part 176. Therefore, when the holder 154 is mounted with respect to the rotating shaft 156a, the plate 154b of the holder 154 is in a state of being abutted against the inner circumference part 178, and a constant gap is reliably maintained between the plate 154b, the outer circumference part 176, and surface of the support column 152b. In this manner, smooth rotation of the holder 154 can be maintained.

The winding and feed device 150 can be used as a device configuring the medicine inspection system 10 by combining it with the inspection device 20 as described above. Through this, supply of the packaging bag continuous body P to the inspection device 20 and winding of the packaging bag continuous body P discharged from the inspection device 20 are implemented, and the convenience of the operation of inspecting the packaging bag continuous body P at the inspection device 20 is improved. Moreover, if the medicine inspection system 10 is provided with a medicine dividing and packaging device 200, the configuration may be such that the packaging bag continuous body P discharged from the medicine dividing and packaging device 200 is wound by the winding and feed device 150, and the wound packaging bag continuous body P is unreeled and supplied to the inspection device 20.

Note that with the medicine inspection system 10, the winding and feed device 150 does not have to be used to both supply (unreel) the packaging bag continuous body P to the inspection device 20 and wind the packaging bag continuous body P discharged from the inspection device 20, and may be used to perform only one of either the unreeling operation or the winding operation. In other words, in the present embodiment, an example was given of a winding and feed device 150 that integrated both a winding device and a feed device, but the device thereof may be provided with only one of the two functions, namely a function as a winding device or a function as a feed device. Furthermore, the winding and feed device 150 does not necessarily have to be used in a combination with an inspection device 20 and a medicine dividing and packaging device 200 forming a medicine inspection system 10, and it may be used alone.

If the above-described winding and feed device 150 is adopted, and packaging bags are inspected by a medicine inspection system 10, a case is assumed in which a plurality of holders 154 on which packaging bag continuous body have been wound in advance are prepared, the holders 154 are sequentially replaced, and inspections are performed. In this type of situation, the multiple holders 154 that have been prepared are preferred to be easily and correctly identified. More specifically, a configuration may be adopted in which an identification medium such as RF-ID is attached to the holders 154, the ability to input identification information into the identification medium thereof is enabled, and a reading device capable of reading the identification information from the identification medium is provided on the winding and feed device 150 side. Even more specifically, by providing the identification medium near the center of the holder 154 and the reading device near the rotating shaft 156 of the winding and feed device 150, or the like, and setting the holder 154, the identification information can be read. Through this, a plurality of prepared holders 154 can be replaced sequentially and inspected without the holders 154 becoming mixed up.

Moreover, as another measure, a barcode or other identification symbol, text, or the like used to identify the prescription may also be printed on the final bag of the packaging bag continuous body wound onto the holder 154. Through this, the barcode or such can be used to avoid mixing up the holders 154. Furthermore, holders 154 having different colors or the like may be prepared so that different holders 154 may be used for different prescriptions in order to avoid mixing up the holders 154.

The present invention is not limited to the example illustrated in the above-described embodiment, and a person skilled in the art could easily understand other embodiments that are possible based on the description and spirit of the present invention without departing from the scope of the patent claims.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A medicinal agent inspection system capable of inspecting each packaging bag with respect to a medicinal agent supplied in a state of a band-shaped packaging bag continuous body lined with packaging bags divided into portions for single doses by packaging paper, the medicinal agent inspection system comprising:
   an inspection unit at which a packaging bag containing a medicinal agent to be inspected is arranged,
   a conveyance device capable of conveying the packaging bag continuous body on a conveyance path along a length direction of the conveyance device which passes the inspection unit from an introduction part toward a discharge part, wherein at least one insertion groove is provided in the conveyance device along a width direction of the conveyance device, and a conveyance width adjusting member including at least one insertion part which can be attached to and removed from the insertion groove of the conveyance device, and the conveyance width adjusting member is provided so as to be capable of extending in the length direction of the conveyance device in the conveyance path, and determining a conveyance area provided for conveyance of the packaging bag continuous body, the conveyance device being capable of adjusting a width of the conveyance area at the conveyance device by moving the conveyance width adjusting member in the width direction of the conveyance device.

2. The medicinal agent inspection system according to claim 1, wherein the conveyance width adjusting member is formed by a plate body, and the conveyance device comprises a plurality of insertion grooves in which the conveyance width adjusting member can be inserted in the width direction, and a width of the conveyance area provided for a conveyance for the packaging bag continuous body can be adjusted by inserting the conveyance width adjusting member into the insertion grooves.

3. The medicinal agent inspection system according to claim 1, comprising:

a photographing device for photographing a packaging bag arranged at the inspection unit;

a front side illumination device capable of illuminating the inspection unit from the photographing device side; and a back side illumination device capable of illuminating the inspection unit from a side opposite of the photographing device, and being capable of implementing bag run out determination process to determine the presence or absence of a packaging bag in the inspection unit using a front side illuminated image photographed by the photographing device when the front side illumination device is in an ON state and the back side illumination device is in an OFF state, and a back side illuminated image photographed by the photographing device when the front side illumination device is in an OFF state and the back side illumination device is in an ON state;

the bag run out determination process comprising:

a partition region detection step which detects a region in which the conveyance width adjusting member is installed based on brightness information obtained from the back side illuminated image;

an inspection region specification step for specifying which region, of regions divided using an installation region of the conveyance width adjusting member detected by the partition region detection step as a boundary, is the region at which the packaging bag continuous body to be inspected is supplied;

a low brightness region extraction step for extracting a low brightness region, which has a level of brightness that is lower than a predetermined brightness, from brightness information obtained from the front side illuminated image; and a determination step which determines a state in which the bags have run out based on a brightness, within a region corresponding to a region of a predetermined size or larger derived in a small region elimination step with the back side illuminated image, being greater than a predetermined reference brightness.

4. The medicinal agent inspection system according to claim 3, further comprising:

an inspection device which is configured to inspect a numerical quantity and/or type of a medicinal agent contained in the packaging bag based on an image photographed of the packaging bag to be inspected; and the packaging bag continuous body has a boundary formed so as to extend in a width direction of the packaging bag continuous body between adjacent packaging bags; and the medicinal agent inspection system further comprises:

a predetermined value acquisition device which is configured to acquire a predetermined value for a length of a packaging bag to be inspected;

a boundary candidate derivation device for deriving a single boundary candidate or a plurality of boundary candidates assumed as boundaries between the packaging bag to be inspected and other packaging bags adjacent on the upstream side and downstream side in the supply direction of the packaging bag continuous body based on an image photographed of the packaging bag continuous body, the boundary candidates thereof derived respectively as an upstream side boundary candidate and a downstream side boundary candidate;

a position information acquisition device for acquiring position information about the upstream side boundary candidate and the downstream side boundary candidate;

a candidate value derivation device for deriving a candidate value of a length of a packaging bag to be inspected by implementing calculations based on position information acquired by the position information acquisition device for each combination of candidates including the upstream side boundary candidate and the downstream side boundary candidate, and a boundary stipulation device which is configured to select a candidate value that is close to a predetermined value for the length of the packaging bag to be inspected from amongst the candidate values derived by the candidate value derivation device, and stipulates a combination of the upstream side boundary candidate and the downstream side boundary candidate that together configure the selected candidate value as the boundaries positioned at the upstream side and downstream side of the packaging bag to be inspected.

* * * * *